(12) United States Patent
Kariyada

(10) Patent No.: US 8,524,347 B2
(45) Date of Patent: Sep. 3, 2013

(54) OPTICAL INFORMATION RECORDING MEDIUM AND METHOD OF MANUFACTURING THE SAME

(75) Inventor: Eiji Kariyada, Tokyo (JP)

(73) Assignee: NEC Corporation, Tokyo (JP)

( * ) Notice: Subject to any disclaimer, the term of this patent is extended or adjusted under 35 U.S.C. 154(b) by 138 days.

(21) Appl. No.: 13/125,694

(22) PCT Filed: Aug. 18, 2009

(86) PCT No.: PCT/JP2009/003917
§ 371 (c)(1),
(2), (4) Date: Apr. 22, 2011

(87) PCT Pub. No.: WO2010/047023
PCT Pub. Date: Apr. 29, 2010

(65) Prior Publication Data
US 2011/0200780 A1    Aug. 18, 2011

(30) Foreign Application Priority Data
Oct. 22, 2008 (JP) ................... 2008-271826

(51) Int. Cl.
*G11B 7/24* (2013.01)

(52) U.S. Cl.
USPC ............ 428/64.1; 428/64.4; 430/270.11

(58) Field of Classification Search
USPC ................. 428/64.4; 430/270.11
See application file for complete search history.

(56) References Cited

U.S. PATENT DOCUMENTS

| | | | |
|---|---|---|---|
| 6,030,677 A | 2/2000 | Ro et al. | |
| 6,177,168 B1 * | 1/2001 | Stevens | 428/64.1 |
| 6,743,320 B2 | 6/2004 | Hisada et al. | |
| 6,764,737 B2 | 7/2004 | Arakawa et al. | |
| 6,858,316 B2 * | 2/2005 | Kubota et al. | 428/500 |
| 2002/0031632 A1 | 3/2002 | Hisada et al. | |
| 2003/0091781 A1 | 5/2003 | Arakawa et al. | |

FOREIGN PATENT DOCUMENTS

| | | |
|---|---|---|
| JP | 64-14742 | 1/1989 |
| JP | 2-156449 | 6/1990 |
| JP | 8-203126 | 8/1996 |
| JP | 10-302318 | 11/1998 |
| JP | 2001-310358 | 11/2001 |
| JP | 2002-216391 | 8/2002 |
| JP | 2003-157575 | 5/2003 |
| JP | 2003-203398 | 7/2003 |
| JP | 2005-332493 | 12/2005 |
| JP | 2006-040530 | 2/2006 |
| JP | 2006-059533 | 3/2006 |
| JP | 2008-176879 | 7/2008 |

OTHER PUBLICATIONS

International Search Report, PCT/JP2009/003917, Oct. 27, 2009.

* cited by examiner

*Primary Examiner* — Elizabeth Mulvaney
(74) *Attorney, Agent, or Firm* — Young & Thompson

(57) ABSTRACT

Provided is a manufacturing method of an optical information storage medium irradiated with laser beams to optically record or reproduce information. A method of manufacturing an optical information storage medium according to the present invention includes forming asperity patterns for guiding laser beams on both sides of a second substrate 12, forming information recording layers 41 and 42 in the asperity patterns, bonding a first substrate 11 to a surface where one information storage layer 41 is formed in the second substrate 12 with an ultraviolet curable resin 22 formed therebetween, and bonding a third substrate 13 to a surface where another information storage layer 42 is formed in the second substrate 12 with an ultraviolet curable resin 22 formed therebetween.

10 Claims, 23 Drawing Sheets

FIFTH STRUCTURE

US 8,524,347 B2

OPTICAL INFORMATION RECORDING MEDIUM AND METHOD OF MANUFACTURING THE SAME

TECHNICAL FIELD

The present invention relates to an optical information storage medium irradiated with laser beams to optically record or reproduce information and a method of manufacturing the same.

BACKGROUND ART

With the rapid development of the recent digital information society, an increase in the capacity has been required in an optical disk, which is one of representative storage devices, and intense development has been advancing in many fields. A $\phi$120 mm optical disk which is now commercially available has a pit length of 0.1 µm to 0.2 µm and a capacity from about 15 GB to 30 GB. A technology has now been considered to increase the capacity by reducing the shortest pit length in the next generation and the next generation. In order to achieve this, an original disk has been manufactured by the Deep UV laser beams or electron beams. Reported is a technique of forming an extremely short pit such as the shortest pit length of 80 nm manufactured by the Deep UV laser beams and the shortest pit length of about 40 nm manufactured by the electron beams. When the shortest pit length is about 40 nm, the capacity is estimated to be about 500 GB/12 cm.

An optical disk substrate used for such high-density recording/reproducing is manufactured by an injection molding method using a stamper on which a replicated pattern is transferred from the original disk of the optical disk described above (see patent literatures 1 to 3).

Another method for achieving an increase in the capacity is forming an information recording layer on an asperity pattern on the optical disk substrate described above. Then, the second asperity pattern is arranged using the ultraviolet curable resin. After forming a film on this asperity pattern, a third asperity pattern is further provided using an ultraviolet curable resin, so as to form a film. By repeating these processes, the optical information recording medium that includes a plurality of information recording layers can be obtained.

Further method for achieving an increase in the capacity is to store in one cartridge a plurality of multi-layer optical disk media each including a plurality of information recording layers as described above. In this way, the increase in the capacity of the optical disk system is intended to be achieved.

CITATION LIST

Patent Literature 1
Japanese Unexamined Patent Application Publication No. 2005-332493
Patent Literature 2
Japanese Unexamined Patent Application Publication No. 2006-59533
Patent Literature 3
Japanese Unexamined Patent Application Publication No. 2008-176879

SUMMARY OF INVENTION

Technical Problem

However, there are problems as follows in the related arts described above.

In the related arts, one cartridge contains a plurality of multi-layer optical disk media each including a plurality of information recording layers. However, in order to increase the storage capacity for each optical disk system, the number of information recording layers provided in one optical disk medium needs to be increased as much as possible. For this purpose, a multi-layered information recording layer has been typically employed. In this case, according to the related arts, the total film thickness of the spacer layer and the asperity pattern forming each information recording layer is typically within a range of approximately from 20 µm to 60 µm. Note that the asperity pattern is formed of an ultraviolet curable resin and the spacer layer is formed of an ultraviolet curable resin or a transparent sheet.

FIG. 20 shows a cross sectional view of an optical information recording medium including two information recording layers as an example. In a substrate 101, an asperity pattern is formed by injection molding. A first information recording layer 102 is formed on the substrate 101. A transparent sheet is bonded to the first information storage layer 102 with an ultraviolet curable resin 103 interposed therebetween. The transparent sheet functions as a spacer layer 104. The asperity pattern is formed on the transparent sheet by an ultraviolet curable resin 105. A second information recording layer 106 is formed on the ultraviolet curable resin 105. A substrate 108 is bonded to the second information storage layer 106 with an ultraviolet curable resin 107 interposed therebetween. As a result, the optical information recording medium including two information recording layers is obtained.

FIG. 21 shows a cross sectional view of an optical information recording medium including four information recording layers. Although detailed manufacturing method is omitted, in a substrate 101, an asperity pattern is formed by injection molding. A first information recording layer 102 is formed on the substrate 101. On the first information storage layer 102, an asperity pattern which also functions as a space layer is manufactured using an ultraviolet curable resin 103. The first information storage layer 102 and the ultraviolet curable resin 103 are sequentially formed and laminated. As a result, the optical information recording medium including four information recording layers can be obtained.

FIG. 22 shows a cross sectional view of an optical information recording medium including another two information recording layers. In a substrate 101, an asperity pattern is formed by injection molding. A first information recording layer 102 is formed on the substrate 101. On the first information storage layer 102, an asperity pattern which also functions as a space layer is formed using an ultraviolet curable resin 103. A second information recording layer 106 is formed on the ultraviolet curable resin 103. A substrate 108 is bonded to the second information storage layer 106 with an ultraviolet curable resin 107 interposed therebetween. As a result, the optical information recording medium including two information recording layers (two-layer medium) can be obtained.

In the two-layer medium where the spacer layer shown in FIG. 20 is formed of a transparent sheet, the first information recording layer 102 and the second information recording layer 106 are sequentially formed by the procedure described above. At this time, some problem may be generated in the process of forming the asperity pattern to form the second information recording layer 106 or the following process of forming the information recording layer. In such a case, all the processes of forming asperity patterns, forming films, and sheet bonding and the like that have been carried out are wasted.

According to the optical information recording medium including four information recording layers shown in FIG. 21, some problem may be generated in the process of manufacturing the asperity patterns or forming the film of the last fourth layer. In such a case, all the processes of forming the asperity patterns, forming films, sheet bonding and the like that have been carried out are wasted. Thus, loss of time and cost further increases compared with those in the optical information recording medium having two information recording layers described above.

In the optical information storage medium including two information storage layers shown in FIG. 22, the first information recording layer 102 and the second information recording layer 106 are sequentially formed by the procedure described above as is similar to the two-layer medium shown in FIG. 20. At this time, some problem may be generated in the process of forming the asperity pattern and the spacer layer to form the second information recording layer 106. In such a case, all the processes of forming the asperity patterns and films that have been carried out are wasted.

The probability that these problems occur increases with increasing number of layers of the information recording layer of the multi-layer optical information recording medium. This is the major factor to degrade the yield of the multi-layer optical information recording medium.

The present invention has been made in view of the above problems, and aims to provide an optical information storage medium and a method of manufacturing the same with excellent yield.

Solution to Problem

A method of manufacturing an optical information storage medium according to the present invention includes: forming asperity patterns for guiding laser beams on both sides of a second substrate; forming information recording layers on the asperity patterns; bonding a first substrate to a surface where one information storage layer is formed in the second substrate with an ultraviolet curable resin formed therebetween; and bonding a third substrate to a surface where another information storage layer is formed in the second substrate with an ultraviolet curable resin formed therebetween.

A method of manufacturing an optical information recording medium according to the present invention includes: applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; applying a first ultraviolet curable resin on another surface of the second substrate, bonding another mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; separating any one of the molds at a boundary with the first ultraviolet curable resin to transfer an asperity pattern, so as to form an information storage layer on the transfer surface of the asperity pattern; applying a second ultraviolet curable resin to a surface where the information storage layer is formed, bonding a first substrate to the surface where the second ultraviolet curable resin is applied, spreading the second ultraviolet curable resin by a spin coating technique, and then irradiating the second ultraviolet curable resin with ultraviolet rays from outside; separating the mold that remains in the second substrate at a boundary with the first ultraviolet curable resin to transfer the asperity pattern, so as to form an information storage layer on the transfer surface of the asperity pattern; and applying a second ultraviolet curable resin to the surface where the information storage layer is formed, bonding a third substrate to the surface where the second ultraviolet curable resin is applied, spreading the second ultraviolet curable resin by a spin coating technique, and then irradiating the second ultraviolet curable resin with ultraviolet rays from outside.

A method of manufacturing an optical information recording medium according to the present invention includes: manufacturing a second structure by: a process of applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of applying a first ultraviolet curable resin to another surface of the second substrate, bonding another mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of separating any one of the molds at a boundary with the first ultraviolet curable resin to transfer an asperity pattern, so as to form an information storage layer on the transfer surface of the asperity pattern; a process of applying a second ultraviolet curable resin to the surface where the information storage layer is formed, bonding a first substrate to the surface where the second ultraviolet curable resin is applied, spreading the second ultraviolet curable resin by a spin coating technique, and irradiating the second ultraviolet curable resin with ultraviolet rays from outside; and a process of separating the mold that remains in the second substrate at a boundary with the first ultraviolet curable resin, so as to form an information storage layer on the transfer surface of the asperity pattern; and applying the second ultraviolet curable resin to a third substrate of the first structure, bonding a surface where the information storage layer is formed in the second structure to the surface where the second ultraviolet curable resin is applied, spreading the second ultraviolet curable resin by a spin coating technique, and then irradiating the second ultraviolet curable resin with ultraviolet rays from outside using a first structure manufactured by the manufacturing method according to Claim 1 or 2 and the second structure.

A method of manufacturing an optical information recording medium according to the present invention includes: manufacturing two third structures by a process of applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of applying a first ultraviolet curable resin to another surface of the second substrate, bonding another mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; and a process of separating any one of the molds at a boundary with the first ultraviolet curable resin to transfer an asperity pattern, so as to form an information storage layer on the transfer surface of the asperity pattern;

manufacturing a fourth structure by applying a second ultraviolet curable resin to the surface where the information storage layer is formed in one of the third structures, bonding a third substrate to the surface where the second ultraviolet curable resin is applied, spreading the second ultraviolet curable resin by a spin coating technique, and then irradiating the second ultraviolet curable resin with ultraviolet rays from outside; applying a second ultraviolet curable resin to a third substrate of the fourth structure, bonding the surface where the information storage layer is formed in the third structure in another side to the surface where the second ultraviolet curable resin is applied, spreading the second ultraviolet curable resin by a spin coating technique, and then irradiating the second ultraviolet curable resin with ultraviolet rays from outside; separating the mold that remains in the side of the third structure in another side at a boundary with the first ultraviolet curable resin, so as to form an information storage layer on the transfer surface of the asperity pattern; applying a second ultraviolet curable resin to the surface where the information storage layer is formed, bonding a third substrate to the surface where the second ultraviolet curable resin is applied, spreading the second ultraviolet curable resin by a spin coating technique, and then irradiating the second ultraviolet curable resin with ultraviolet rays from outside; separating the mold that remains in the side of the fourth structure at a boundary with the first ultraviolet curable resin to transfer an asperity pattern, so as to form an information storage layer on the transfer surface of the asperity pattern; and applying the second ultraviolet curable resin to the surface where the information storage layer is formed, bonding a first substrate to the surface where the second ultraviolet curable resin is applied, spreading the second ultraviolet curable resin by a spin coating technique, and then irradiating the second ultraviolet curable resin with ultraviolet rays from outside.

A method of manufacturing an optical information recording medium according to the present invention includes: repeatedly performing a process of applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of applying a first ultraviolet curable resin to another surface of the second substrate, bonding another mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of separating any of the molds at a boundary with the first ultraviolet curable resin to transfer an asperity pattern, so as to form an information storage layer on the transfer surface of the asperity pattern; and a process of separating the mold that remains in the second substrate at a boundary with the first ultraviolet curable resin to transfer the asperity pattern, so as to form an information storage layer on the transfer surface of the asperity pattern for multiple times, so as to manufacture a plurality of fifth structures having the second substrate with the asperity patterns formed on both surfaces thereof by the first ultraviolet curable resin and the information storage layers further formed on the asperity patterns; and a process of applying a second ultraviolet curable resin to a first substrate, bonding the surface where one information storage layer is formed in at least one fifth structure to the surface where the second ultraviolet curable resin is applied, spreading the second ultraviolet curable resin by a spin coating technique, and then irradiating the second ultraviolet curable resin with ultraviolet rays from outside, and a process of applying a second ultraviolet curable resin to the surface where the information storage layer of another side in the fifth structure is formed, bonding a third substrate to the surface where the second ultraviolet curable resin is applied, spreading the second ultraviolet curable resin by a spin coating technique, and then irradiating the second ultraviolet curable resin by ultraviolet rays from outside, so as to alternately laminate and bond the fifth structure and the third substrate multiple times on the first substrate with the second ultraviolet curable resin interposed therebetween.

Advantageous Effects of Invention

According to the present invention, it is possible to provide an optical information storage medium and a method of manufacturing the same with excellent yield.

DESCRIPTION OF EMBODIMENTS

Hereinafter, exemplary embodiments of the present invention will be described in detail with reference to the drawings. Note that the present invention is not limited to the exemplary embodiments described below. The following description and the drawings are simplified as appropriate for the sake of clarity.

In the exemplary embodiments below, a transparent stamper is employed as a mold. In the transparent stamper, a groove and a land or a pre-format for optical disk are formed. As the transparent stamper, a stamper having a pattern formed on a quartz glass or a stamper having a pattern formed on a polycarbonate (PC) substrate are used as required. As a first substrate, a PC substrate having a thickness of from 90 µm to 1200 µm is employed as needed. As a second substrate and a third substrate, a PC film substrate having a thickness of from 20 µm to 30 µm is employed.

An ultraviolet curable resin which is subjected to defoaming treatment in a vacuum in advance before application is used as an ultraviolet curable resin in each of the exemplary embodiments described below. This is to prevent minute air bubbles that are included in rare cases from entering the ultraviolet curable resin that is applied when implanting the ultraviolet curable resin into an application device.

First Exemplary Embodiment

A first exemplary embodiment of the present invention will be described in detail with reference to FIGS. 1 to 4. In the first exemplary embodiment, a manufacturing process of an optical information storage medium including two information recording layers will be described.

In the first exemplary embodiment, a polycarbonate stamper (PC stamper) is employed as a mold. The PC stamper is mass-replicated by injection molding. A first substrate is arranged in a side irradiated with laser beams. As the first substrate, a flat polycarbonate substrate (PC substrate) having no asperity pattern formed on the surface is employed. The first substrate has a thickness of 100 µm. In a second substrate, asperity patterns are formed on both surfaces (upper and lower surfaces) with the ultraviolet curable resin interposed therebetween. As the second substrate, a polycarbonate film substrate (PC film substrate) is employed. The second substrate has a thickness of 25 µm. As a third substrate which is other substrate than the first and second substrates, a polycarbonate film substrate (PC film substrate) is employed. The third substrate has a thickness of 25 µm. Each film thickness of a first ultraviolet curable resin 21 and a second ultraviolet curable resin 22 is set to 1 µm. Note that an ultraviolet curable resin which is applied to form the asperity patterns on both sides of the second substrate is called a first ultraviolet curable resin, and another ultraviolet curable resin is called a second ultraviolet curable resin.

Hereinafter, the manufacturing process of the optical information storage medium will be described with reference to FIGS. 1 to 4.

Figure 1A:
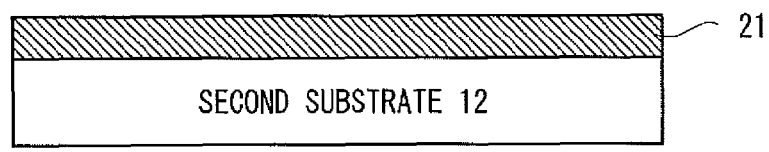
FIG. 1A is a process diagram showing a manufacturing method of an optical information storage medium according to a first exemplary embodiment of the present invention.
Figure 1B:
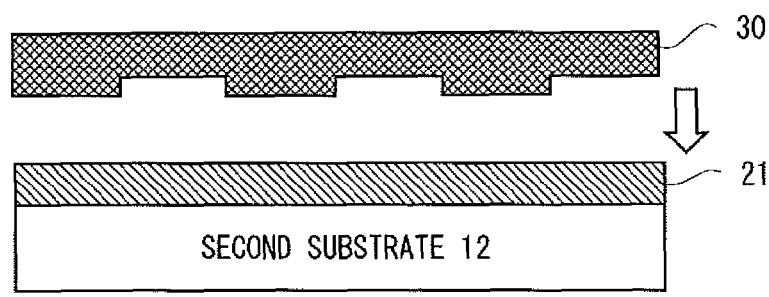
FIG. 1B is a process diagram showing the manufacturing method of the optical information storage medium according to the first exemplary embodiment of the present invention.
Figure 1C:
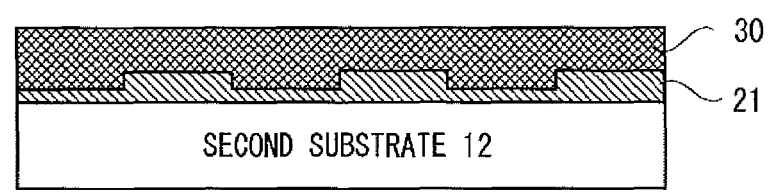
FIG. 1C is a process diagram showing the manufacturing method of the optical information storage medium according to the first exemplary embodiment of the present invention.

First, as shown in FIG. 1A, a first ultraviolet curable resin 21 is applied to one surface of a second substrate 12. Then, as shown in FIGS. 1B and 1C, a mold 30 is bonded to the surface where the first ultraviolet curable resin 21 is applied. In the mold 30, a fine pattern is formed in advance. Further, the first ultraviolet curable resin 21 is spread by a spin coating technique, and then irradiated with ultraviolet rays from outside.

Figure 1D:
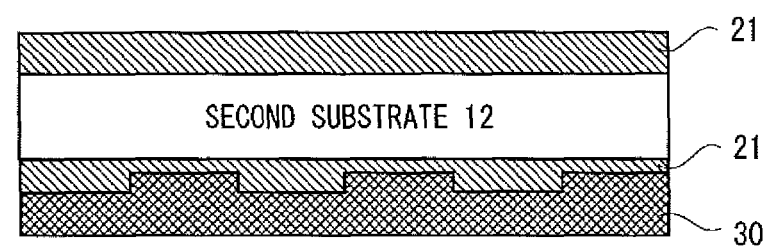
FIG. 1D is a process diagram showing the manufacturing method of the optical information storage medium according to the first exemplary embodiment of the present invention.
Figure 2A:
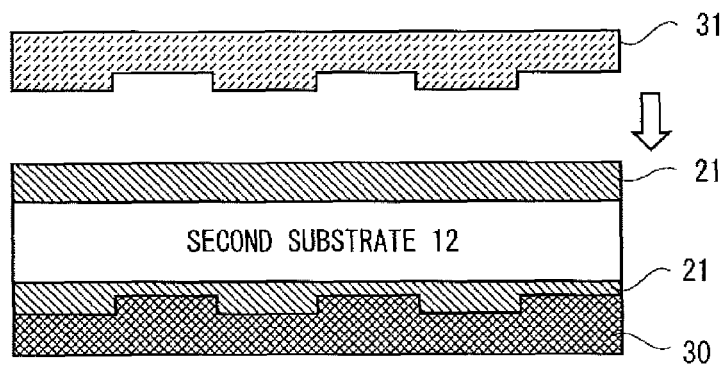
FIG. 2A is a process diagram showing the manufacturing method of the optical information storage medium according to the first exemplary embodiment of the present invention.
Figure 2B:
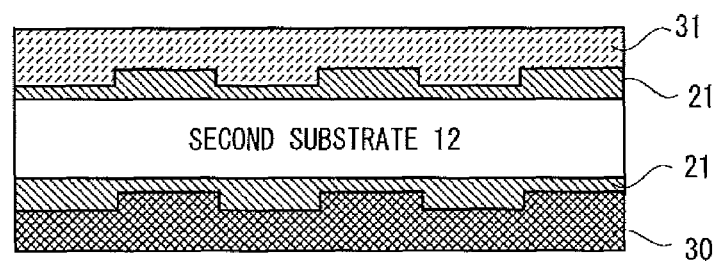
FIG. 2B is a process diagram showing the manufacturing method of the optical information storage medium according to the first exemplary embodiment of the present invention.

Next, as shown in FIG. 1D, the first ultraviolet curable resin 21 is also applied to the other surface of the second substrate 12. Then, as shown in FIGS. 2A and 2B, another mold 31 is bonded to the surface where the first ultraviolet curable resin 21 is applied. In the mold 31, a fine pattern is formed in advance. Further, the first ultraviolet curable resin 21 is spread by a spin coating technique, and then irradiated with ultraviolet rays from outside.

Figure 2C:
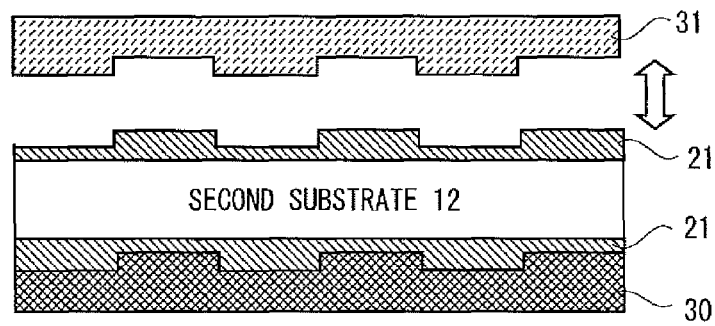
FIG. 2C is a process diagram showing the manufacturing method of the optical information storage medium according to the first exemplary embodiment of the present invention.
Figure 2D:
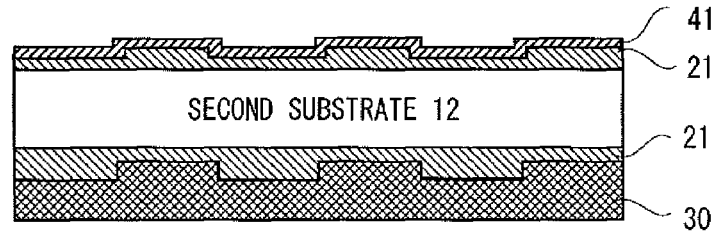
FIG. 2D is a process diagram showing the manufacturing method of the optical information storage medium according to the first exemplary embodiment of the present invention.

Next, as shown in FIG. 2C, one mold 31 is separated at a boundary with the first ultraviolet curable resin 21 to transfer the asperity pattern. Then, as shown in FIG. 2D, an information storage layer 41 is formed on the surface where the asperity pattern is transferred.

Figure 3A:
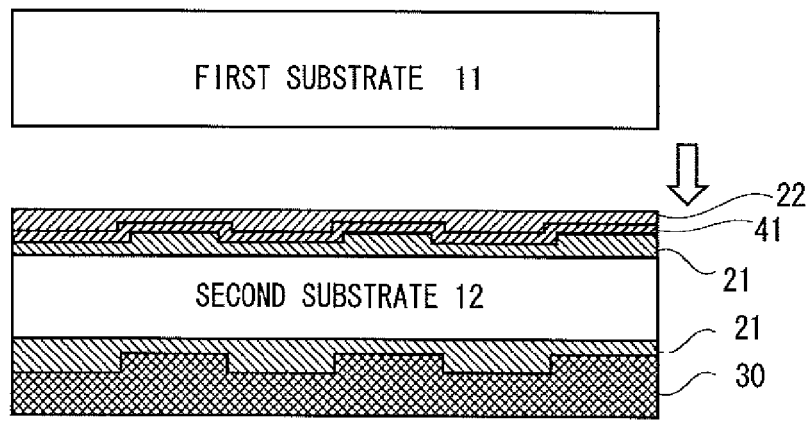
FIG. 3A is a process diagram showing the manufacturing method of the optical information storage medium according to the first exemplary embodiment of the present invention.
Figure 3B:
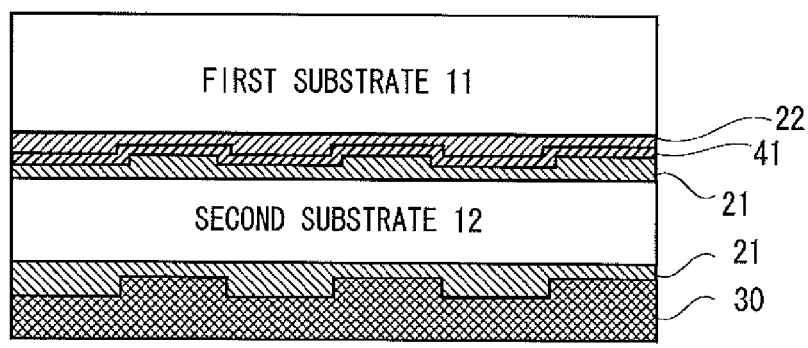
FIG. 3B is a process diagram showing the manufacturing method of the optical information storage medium according to the first exemplary embodiment of the present invention.

Next, as shown in FIGS. 3A and 3B, a second ultraviolet curable resin 22 is applied to the surface where the information storage layer 41 is formed. Then, a first substrate 11 is bonded to the surface where the second ultraviolet curable resin 22 is applied. Further, the second ultraviolet curable resin 22 is spread by a spin coating technique, and then irradiated with ultraviolet rays from outside.

Figure 3C:
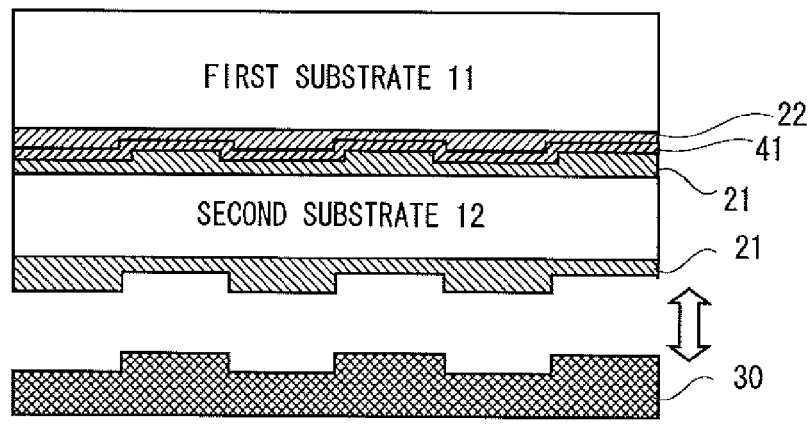
FIG. 3C is a process diagram showing the manufacturing method of the optical information storage medium according to the first exemplary embodiment of the present invention.
Figure 4A:
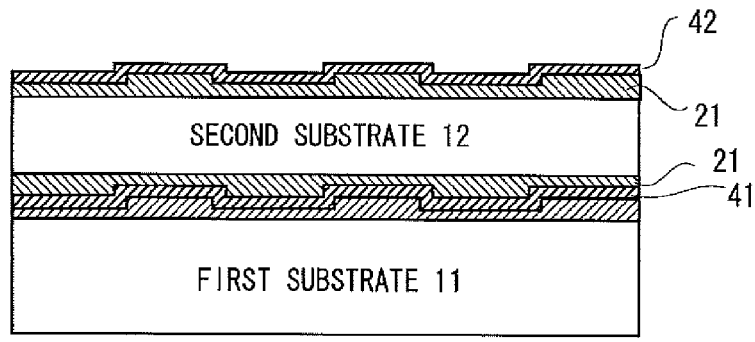
FIG. 4A is a process diagram showing the manufacturing method of the optical information storage medium according to the first exemplary embodiment of the present invention.

Next, as shown in FIG. 3C, the mold 30 that remains in the second substrate 12 is separated at a boundary with the first ultraviolet curable resin 21 to transfer the asperity pattern. Then, as shown in FIG. 4A, an information storage layer 42 is formed on the surface where the asperity pattern is transferred.

Figure 4B:
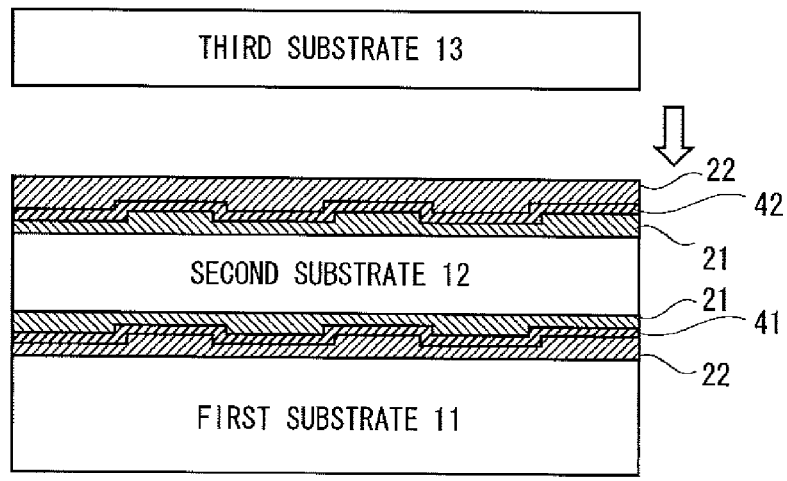
FIG. 4B is a process diagram showing the manufacturing method of the optical information storage medium according to the first exemplary embodiment of the present invention.
Figure 4C:
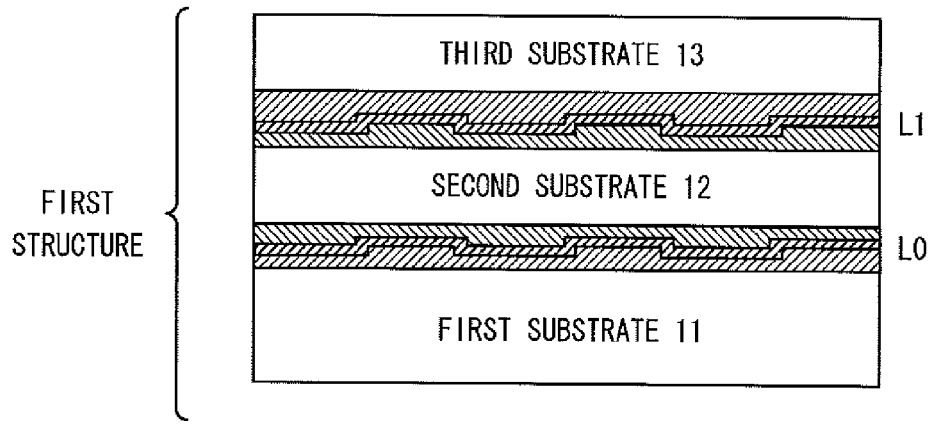
FIG. 4C is a cross sectional view schematically showing the optical information storage medium manufactured by the manufacturing method of the optical information storage medium according to the first exemplary embodiment of the present invention.

Now, as shown in FIGS. 4B and 4C, the second ultraviolet curable resin 22 is applied to the surface where the information storage layer 42 is formed. Then, a third substrate 13 is bonded to the surface where the second ultraviolet curable resin 22 is applied. Further, the second ultraviolet curable resin 22 is spread by a spin coating technique, and then irradiated with ultraviolet rays from outside.

In summary, the asperity patterns for guiding the laser beams are formed on both sides of the second substrate 12, and the information recording layers 41 and 42 are formed on the asperity patterns. The second substrate 12 where the information recording layers 41 and 42 are formed and the substrates 11 and 13 that are different from the substrate 12 are alternately laminated using the ultraviolet curable resin 22. As a result, the optical information storage medium of bond type including the two information recording layers 41 and 42 can be obtained. In short, the fine asperity patterns for guiding the laser beams and the information recording layers 41 and 42 are formed on both surfaces of the second substrate 12 having a thickness of 25 μm on the first substrate 11 having a thickness of 100 μm. Further, the third substrate 13 having a thickness of 25 μm is a dummy substrate. In this optical information storage medium, the asperity patterns are manufactured in and transferred on the both sides of the second substrate 12 substantially at the same time. Thus, even when there is caused any problem in the transfer process, the process can be stopped comparatively at the initial stage of the process. Accordingly, there is no need to perform the wasteful process such as the manufacturing of the optical information recording medium of the related art. Accordingly, it is possible to stably provide the multi-layer optical information recording medium which makes it possible to provide a reproduction signal of excellent quality without reducing the yield.

Now, when the wavelength of the laser beams that are used is 405 nm, the depth of the fine asperity pattern that guide the laser beams is about 32 nm when the asperity pattern is the spiral groove of the land and the groove, and is about 64 nm when the asperity pattern is the ROM pit. Accordingly, it is only required that the film thickness of the first ultraviolet curable resin 21 that forms the asperity pattern is at least about 50 nm. However, when the ultraviolet curable resin is applied and spread by a spin coating technique, using a thin resin film having a thickness of about 50 nm makes it difficult to neatly apply the ultraviolet curable resin because of an influence of fine asperity or surface-attached substances on the application surface.

Thus, it is desirable that the thickness of the resin film after the resin is applied and spin-spread, and is subjected to ultraviolet curing is 0.5 μm or more. For example, it is confirmed by measuring the film thickness that, when the resin film thickness after ultraviolet curing is adjusted to be 1 μm, the resin film thickness in the disk surface is within the range from 0.9 μm to 1.1 μm.

Similarly, it is also required that the second ultraviolet curable resin 22 used to bond each substrate also has the resin film thickness of 0.5 μm or more after the resin is applied and spin-spread, and is subjected to ultraviolet curing. For example, when the resin film thickness after ultraviolet curing is adjusted to be 1 μm, it is confirmed by measuring the film thickness that the resin film thickness after bonding is within the range from 0.9 μm to 1.1 μm. The variation of the resin film thickness is about plus/minus 10% with respect to the set film thickness, and 20% in the peak width.

Figure 23:
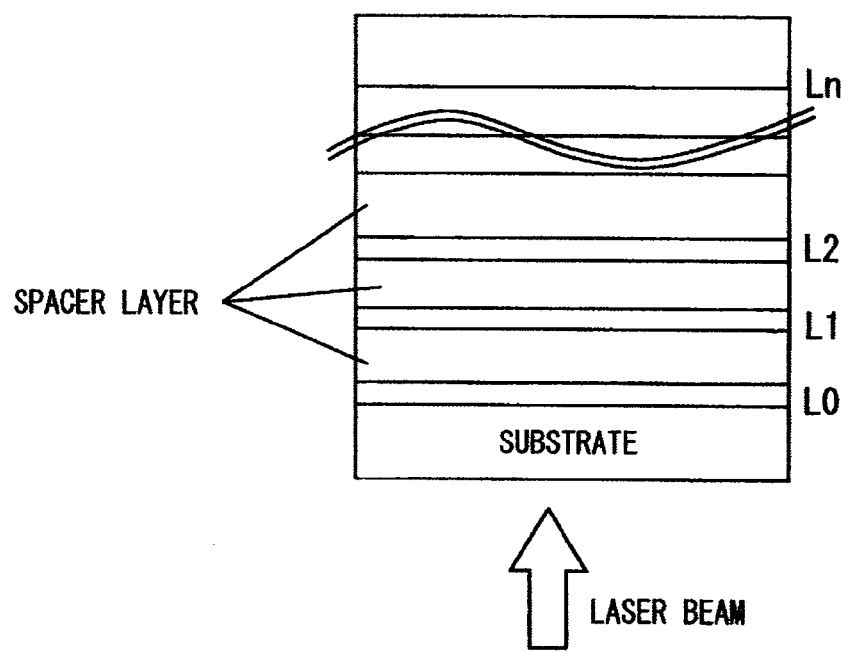
FIG. 23 is a cross sectional view schematically showing a typical optical information storage medium.
Figure 24:
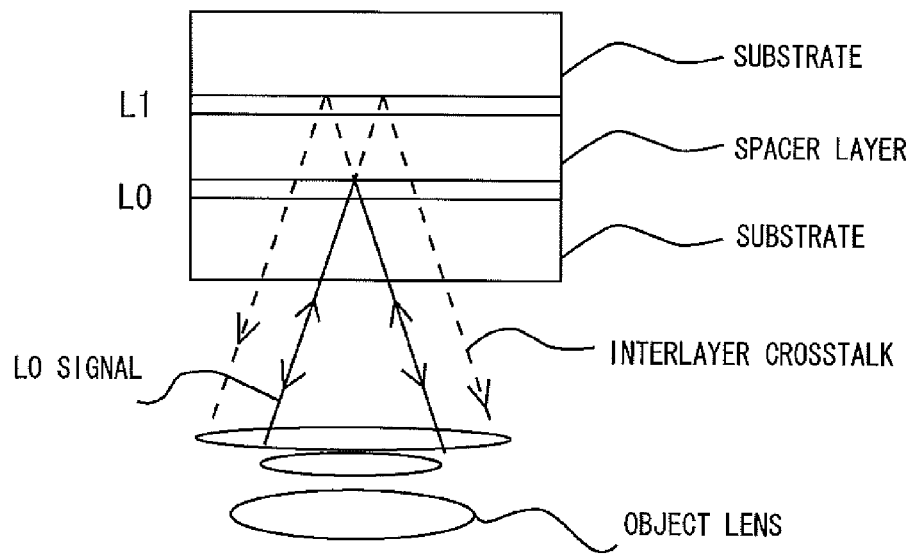
FIG. 24 is a conceptual diagram of interlayer crosstalk.

By the way, FIG. 23 is a cross sectional view showing a typical multi-layer optical information recording medium. In the configuration shown in FIG. 23, a plurality of information recording layers (n+1 layers in total in the example shown in FIG. 23) are laminated on a substrate with spacer layers interposed therebetween. In the specification, the information recording layer which is in the side closest to the incident plane of the laser beam is denoted by L0, the information recording layer which is second closest to the laser beam incident plane is denoted by L1, the next information storage layer is denoted by L2, for example, in order to identify each information recording layer. Although the information recording layers of L0, L1 ... Ln in FIG. 23 are each actually provided on the asperity patterns, the asperity patterns are omitted in FIG. 23. The spacer layers serve to bond the plurality of information recording layers. The spacer layers also serve to reduce interlayer crosstalk. The interlayer crosstalk means, as shown in FIG. 24, the reflected light component from other information storage layers (in this example, reflected light component from the information storage layer L1 when the information storage layer L0 is reproduced). The reflected light component is included in the reproduction signal obtained when the data in a certain information recording layer is reproduced.

Figure 22:
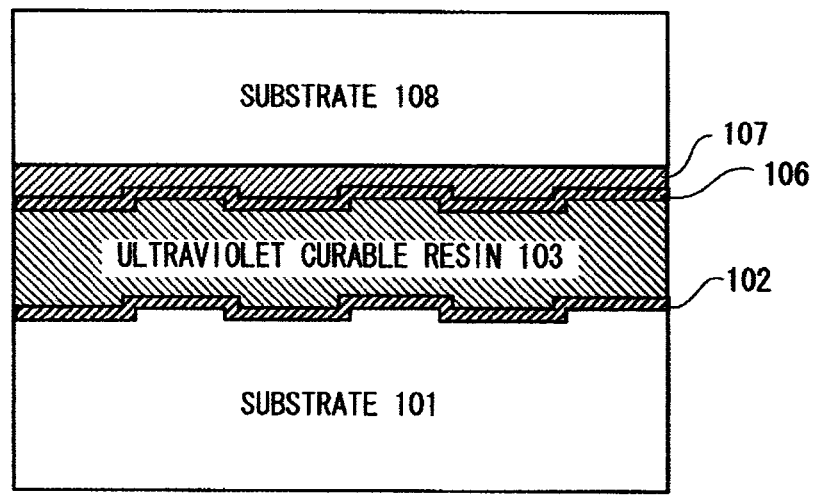
FIG. 22 is a cross sectional view schematically showing an optical information storage medium including two information storage layers according to a related art.

The interlayer crosstalk causes reduction in the modulation degree of the reproduction signal and degradation of the quality of the reproduction signal. The interlayer crosstalk can be reduced with increasing thickness of the spacer layer. Meanwhile, the spherical aberration of the light focusing beam used for recording or reproducing the information increases with increasing thickness of the spacer layer, which degrades the quality of the reproduction signal. Accordingly, the thickness of the spacer layer needs to be optimized in consideration of the trade-off relation between the decrease in the interlayer crosstalk and the increase in the spherical aberration. More specifically, as shown in FIG. 22, when the asperity pattern and the spacer layer for forming the information recording layer 106 are formed of ultraviolet curable resin, the thickness of the resin film needs to be at least about 20 μm. This ultraviolet curable resin is typically applied and spread on a substrate by a spin coating technique. In such a method, the applied film thickness varies by about 10 to 20% of the thickness of the applied film. For example, when it is assumed that the applied film thickness is 20 μm, the applied film thickness varies by about 2 μm to 4 μm. This gives an influence on the interlayer crosstalk or the spherical aberration described above. Such an influence may cause degradation in the quality of the reproduction signal.

As stated above, the thickness of the spacer layer needs to be optimized also in the present invention in consideration of the trade-off relation between the decrease in the interlayer crosstalk and the increase in the spherical aberration.

When the information storage layer 41 (L0) in the optical information storage medium according to the first exemplary embodiment is reproduced, the spacer layer that gives an influence on the interlayer crosstalk is the part where the film thickness of the second substrate 12 and the film thickness of the asperity pattern formed of the first ultraviolet curable resin 21 arranged on both sides of the second substrate 12 are added. In summary, it is understood that the spacer layer is in the range from 26.8 μm to 27.2 μm. This means the variation in the film thickness of about plus/minus 0.7% with respect to the setting value of 27 μm. Such a small degree of variation does not give any influence on the interlayer crosstalk or the spherical aberration described above. It should be noted that the setting value of the spacer layer is set to 27 μm because the thickness of the second substrate 12 is 25 μm and the thickness of each of the first ultraviolet curable resins 21 arranged on both sides of the second substrate 12 is 1 μm.

Figure 25:
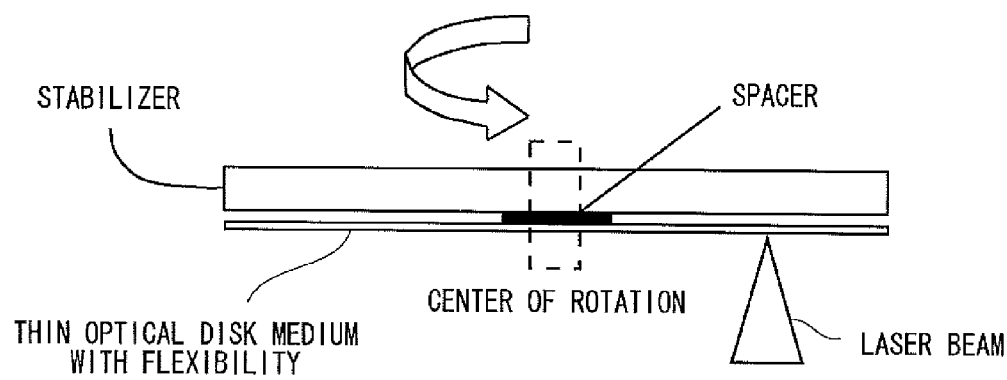
FIG. 25 is a diagram showing a recording/reproducing method of an optical information storage medium having flexibility.

Now, the laser beams pass through the first substrate 11 and are incident on the information storage layers L0 and L1. Note that the total thickness of the optical information recording medium shown in this exemplary embodiment is 154 μm (100+1+1+25+1+1+25=154 μm). This itself has no self-supportability but has flexibility. Accordingly, as shown in FIG. 25, the optical information storage medium is rotated with the disk rotation stabilizing plate having a plurality of holes arranged near the spacer outer periphery with the spacer of 0.2 mm interposed therebetween, so as to reproduce signals. The result of actually reproducing the signal in the information storage layer L0 using the system described above has revealed that the bit error rate is about $1.1 \times 10^{-5}$ and the signal can be reproduced without any problem.

On the other hand, when the film thickness of the first ultraviolet curable resin 21 and the second ultraviolet curable resin 22 is thicker than 1 μm, the signal can be reproduced without any problem to some degree by performing spherical aberration correction. However, the quality of the reproduction signal is degraded when it exceeds the range of the aberration correction.

Table 1 shows a relation between the film thickness of each ultraviolet curable resin and the bit error rate when the information storage layer L0 is reproduced when the film thickness of the first ultraviolet curable resin 21 and the second ultraviolet curable resin 22 is changed within the range from 0.5 μm to 6 μm. As stated above, the thickness of the spacer layer corresponds to the sum of the film thickness of the second substrate 12 and the film thickness of the asperity pattern formed by the first ultraviolet curable resin 21 arranged on both sides of the second substrate 12. Accordingly, the thickness of the second substrate 12 is changed within the range from 15 μm to 26 μm in a way that the sum of the film thickness of the second substrate 12 and the film thickness of the asperity pattern formed by the first ultraviolet curable resin 21 arranged on both sides of the second substrate 12 is always equal to 27 μm. When the optical information recording medium of bond type including two information recording layers as stated above is employed, the thickness of the second ultraviolet curable resin 22 is changed as is similar to the first ultraviolet curable resin 21. The thickness of the second ultraviolet curable resin 22 does not directly influence the interlayer crosstalk or the spherical aberration.

TABLE 1

Relation between each resin film thickness and bit error rate

| First ultraviolet curable resin 21 (μm) | Second ultraviolet curable resin 22 (μm) | Bit error rate |
| --- | --- | --- |
| 0.5 | 0.5 | $8.1 \times 10^{-6}$ |
| 1 | 1 | $1.1 \times 10^{-5}$ |
| 2 | 2 | $2.7 \times 10^{-5}$ |
| 3 | 3 | $3.3 \times 10^{-5}$ |
| 4 | 4 | $7.2 \times 10^{-5}$ |
| 5 | 5 | $1.4 \times 10^{-4}$ |
| 6 | 6 | $3.6 \times 10^{-4}$ |

It can be seen from the measuring result in Table 1 that the bit error rate is low and there is no problem in the signal quality if each resin film thickness is equal to or smaller than 5 μm.

As will be understood from the above description, the variations of the resin film thickness can be made smaller by reducing the thickness of the ultraviolet curable resin film which tends to be a factor of the variations of the film thickness as much as possible. Thus, the film thickness of the first ultraviolet curable resin 21 is preferably within a range from 0.5 μm to 5 μm (0.5 μm or more and 5 μm or less).

In the first exemplary embodiment, most part of the film thickness in the spacer layer between the information recording layers that gives an influence on the interlayer crosstalk or the spherical aberration is formed of a thin PC film substrate. This is because PC films have little variations in the film thickness. Further, the resin for bonding layers or the asperity patterns or pit for guiding the laser beams are formed of the ultraviolet curable resin of 5 μm or smaller. Accordingly, it is possible to obtain a reproduction signal with high signal quality in each information recording layer.

In order to increase the storage capacity of the optical disk system, it is required to store the multi-layer optical disk media each including a plurality of information recording layers in one optical disk medium as much as possible in one cartridge. In order to achieve this, the thickness for each optical disk medium needs to be made thin as much as possible. A main substrate of the related multi-layer optical information recording medium typically has a thickness from 600 μm to 1200 μm. When such a thick substrate is used, it is difficult to store many optical disk media in one cartridge. In the first exemplary embodiment, a thin substrate having a thickness of about 100 μm is used as the first substrate in place of the substrate having a large thickness of 600 μm or 1200 μm that is typically used. By sequentially laminating a plurality of information recording layers on the substrate, the number of optical information recording media that can be stored in the cartridge with the same capacity dramatically increases. Accordingly, it is possible to dramatically increase the storage capacity per unit volume, thereby easily achieving an increase in the capacity of the optical disk system.

First Comparative Example

As a comparative example, the film thickness of the spacer layer shown in FIG. 22 is measured in a similar way as in the first exemplary embodiment. The spacer layer also serves as the asperity pattern formed using the ultraviolet curable resin 103 of the optical information recording medium including two information recording layers. As the substrate 101 where the asperity pattern is formed by injection molding, the PC substrate having a thickness of 0.6 mm is employed. Further, as the dummy bonding substrate 108, the PC substrate having a thickness of 0.6 mm is employed. Such an optical information recording medium has the same form as that including two information recording layers typically employed.

The result of measuring the film thickness of the spacer layer has revealed that the film thickness is within the range from 24.3 μm to 29.5 μm with respect to the film thickness setting value of 27 μm. Namely, an increase in the resin film thickness causes an increase in the variation degree of the resin film thickness after ultraviolet curing. The ratio is substantially equal to the variation degree described in the first exemplary embodiment, which is the variation of about 20% of the setting value in the peak width. The bit error rate when the information storage layer L0 of the optical information recording medium is reproduced is $1.8 \times 10^{-4}$, which is a somewhat high error rate.

Accordingly, as described in the first exemplary embodiment, it is preferable that most part of the spacer layer is formed of a film substrate having the constant thickness. It is further preferable that the part of the fine asperity patterns that guide the laser beams and the bonding layer are formed of the ultraviolet curable resin. Accordingly, a multi-layer optical information recording medium with excellent signal quality can be obtained.

Note that the total thickness of the optical information recording medium described in the comparative example is 653 μm (600+27+1+25=653 μm). As described in the first exemplary embodiment, by using a relatively thin film substrate as the first substrate 11 and the third substrate 13, the total thickness of the medium becomes 154 μm. The optical information storage medium according to the first exemplary embodiment can be reduced to the thickness of about ¼ compared with the optical information storage medium of the comparative example, although there is no difference in the storage capacity in the two information recording layers. Accordingly, when the media are closely contained in the cartridge having the same height, e.g., one having the height of 30 mm, 193 optical information storage media according to the first exemplary embodiment can be stored, whereas 44 optical information storage media according to this comparative example can be stored. In summary, the storage capacity in the optical information storage medium according to the first exemplary embodiment can be made about four times as large as that according to the comparative example.

Second Exemplary Embodiment

Next, as a second exemplary embodiment, a manufacturing process of an optical information recording medium including four information recording layers is described. In the second exemplary embodiment, an optical information storage medium of the first exemplary embodiment is employed as a first structure, and composes an optical information storage medium with a second structure.

A polycarbonate stamper (PC stamper) is used as a mold in the second exemplary embodiment. The PC stamper is mass-replicated by injection molding. A first substrate is arranged in the uppermost layer and the lowermost layer. A flat polycarbonate substrate (PC substrate) having no asperity pattern formed on the surface is used as the first substrate. The thickness of the first substrate is 100 μm. A second substrate has asperity patterns formed on both surfaces thereof (upper and lower surfaces) with an ultraviolet curable resin interposed therebetween. A polycarbonate film substrate (PC film substrate) is used as the second substrate. The second substrate has a thickness of 25 μm. A polycarbonate film substrate (PC film substrate) is used as a third substrate which is other substrate than the first and second substrates. The third substrate has a thickness of 25 μm. Further, the film thickness of each of a first ultraviolet curable resin 21 and a second ultraviolet curable resin 22 is set to be 1 μm. Also in the second exemplary embodiment, the ultraviolet curable resin applied to the second substrate to form the asperity pattern is called a first ultraviolet curable resin, and another ultraviolet curable resin is called a second ultraviolet curable resin.

Hereinafter, a procedure of manufacturing the optical information storage medium is described with reference to FIGS. 5 to 9.

Figure 5A:
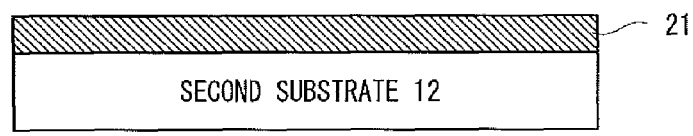
FIG. 5A is a process diagram showing a manufacturing method of an optical information storage medium according to a second exemplary embodiment of the present invention.
Figure 5B:
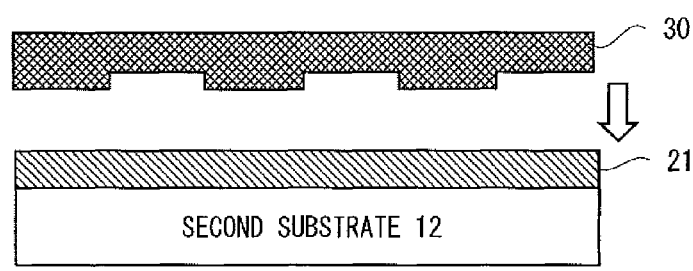
FIG. 5B is a process diagram showing the manufacturing method of the optical information storage medium according to the second exemplary embodiment of the present invention.
Figure 5C:
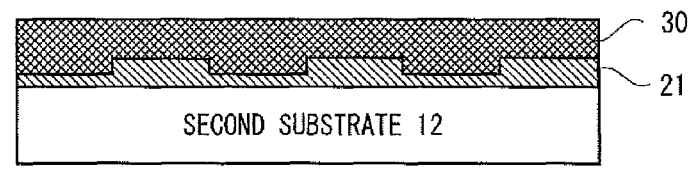
FIG. 5C is a process diagram showing the manufacturing method of the optical information storage medium according to the second exemplary embodiment of the present invention.

First, as shown in FIG. 5A, a first ultraviolet curable resin 21 is applied to one surface of a second substrate 12. Then, as shown in FIGS. 5B and 5C, a mold 30 is bonded to the surface where the first ultraviolet curable resin 21 is applied. In the mold 30, a fine pattern is formed in advance. Further, the first ultraviolet curable resin 21 is spread by a spin coating technique, and then irradiated with ultraviolet rays from outside.

Figure 5D:
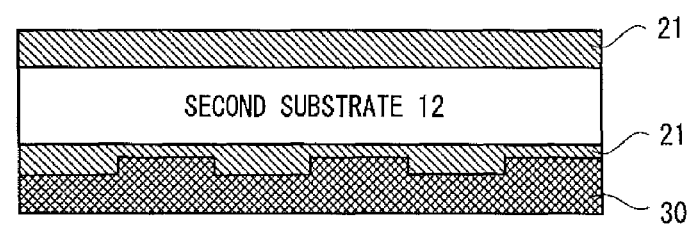
FIG. 5D is a process diagram showing the manufacturing method of the optical information storage medium according to the second exemplary embodiment of the present invention.
Figure 6A:
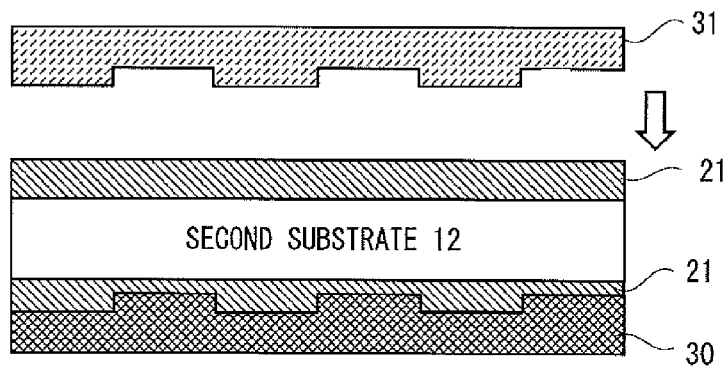
FIG. 6A is a process diagram showing the manufacturing method of the optical information storage medium according to the second exemplary embodiment of the present invention.
Figure 6B:
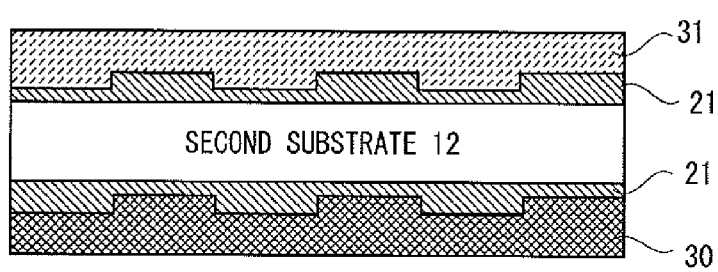
FIG. 6B is a process diagram showing the manufacturing method of the optical information storage medium according to the second exemplary embodiment of the present invention.

Next, as shown in FIG. 5D, the first ultraviolet curable resin 21 is also applied to the other surface of the second substrate 12. Then, as shown in FIGS. 6A and 6B, another mold 31 is bonded to the surface where the first ultraviolet curable resin 21 is applied. In the mold 31, a fine pattern is formed in advance. Further, the first ultraviolet curable resin 21 is spread by a spin coating technique, and then irradiated with ultraviolet rays from outside.

Figure 6C:
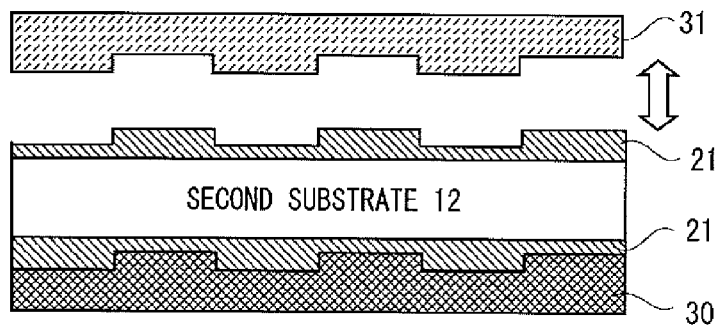
FIG. 6C is a process diagram showing the manufacturing method of the optical information storage medium according to the second exemplary embodiment of the present invention.
Figure 6D:
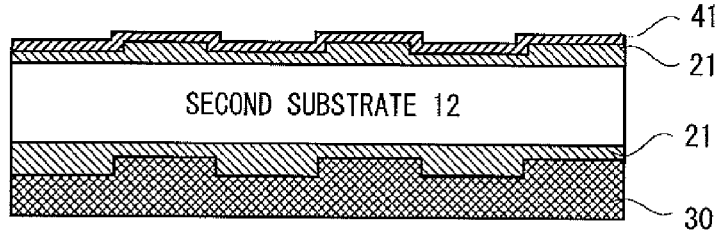
FIG. 6D is a process diagram showing the manufacturing method of the optical information storage medium according to the second exemplary embodiment of the present invention.

Next, as shown in FIG. 6C, one mold 31 is separated at a boundary with the first ultraviolet curable resin 21 to transfer the asperity pattern. Then, as shown in FIG. 6D, an information storage layer 41 is formed on the surface where the asperity pattern is transferred.

Figure 7A:
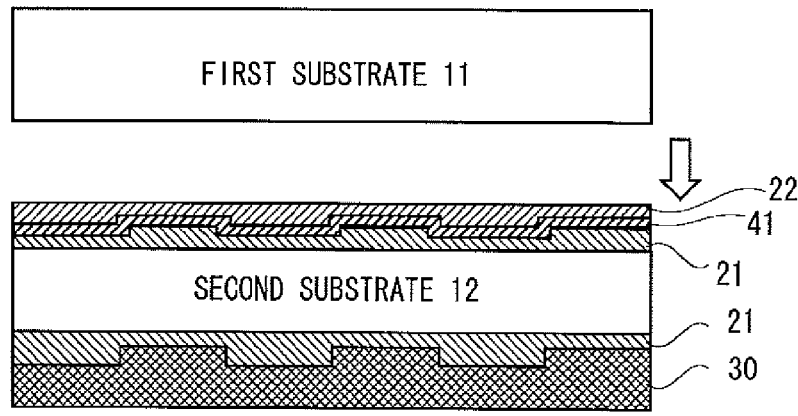
FIG. 7A is a process diagram showing the manufacturing method of the optical information storage medium according to the second exemplary embodiment of the present invention.
Figure 7B:
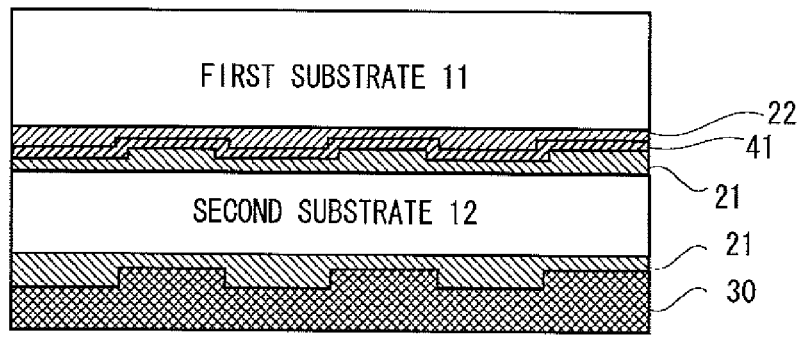
FIG. 7B is a process diagram showing the manufacturing method of the optical information storage medium according to the second exemplary embodiment of the present invention.

Next, as shown in FIG. 7A, a second ultraviolet curable resin 22 is applied to the surface where the information storage layer 41 is formed. Then, as shown in FIG. 7B, a first substrate 11 is bonded to the surface where the second ultraviolet curable resin 22 is applied. Further, the second ultraviolet curable resin 22 is spread by a spin coating technique, and then irradiated with ultraviolet rays from outside.

Figure 7C:
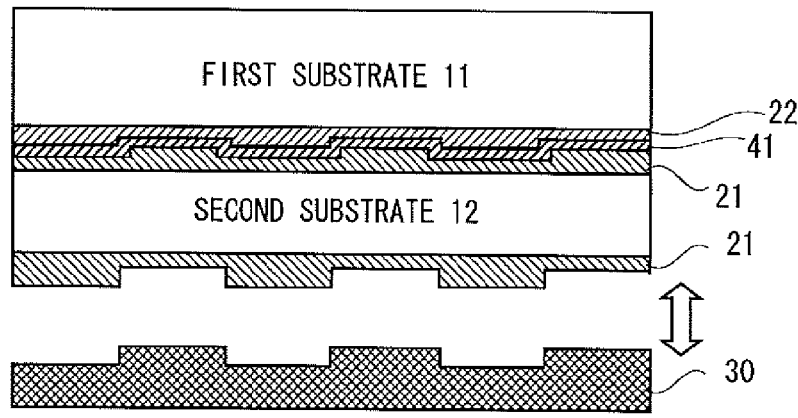
FIG. 7C is a process diagram showing the manufacturing method of the optical information storage medium according to the second exemplary embodiment of the present invention.
Figure 8A:
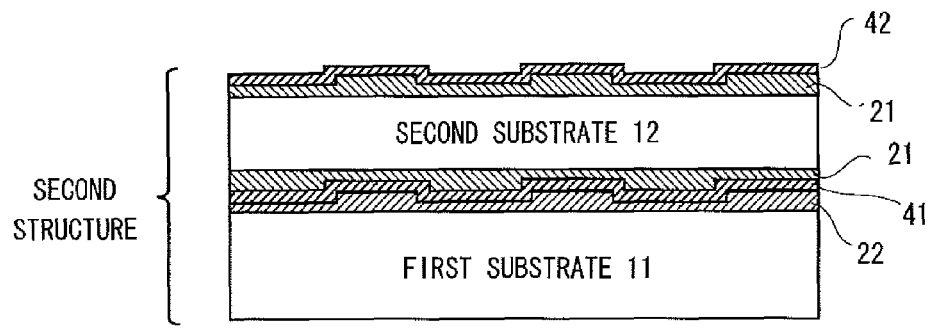
FIG. 8A is a process diagram showing the manufacturing method of the optical information storage medium according to the second exemplary embodiment of the present invention.

Next, as shown in FIG. 7C, the mold 30 that remains in the second substrate 12 is separated at a boundary with the first ultraviolet curable resin 21 to transfer the asperity pattern. Then, as shown in FIG. 8A, an information storage layer 42 is formed on the surface where the asperity pattern is transferred. As a result, a second structure is manufactured.

Figure 8B:
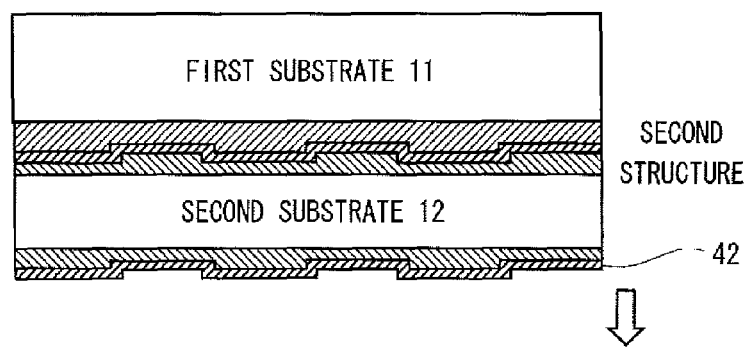
FIG. 8B is a process diagram showing the manufacturing method of the optical information storage medium according to the second exemplary embodiment of the present invention.
Figure 8B:
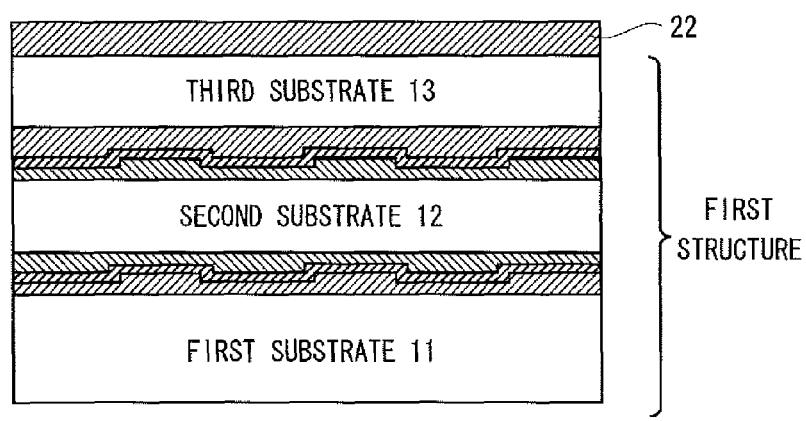
Figure 9:
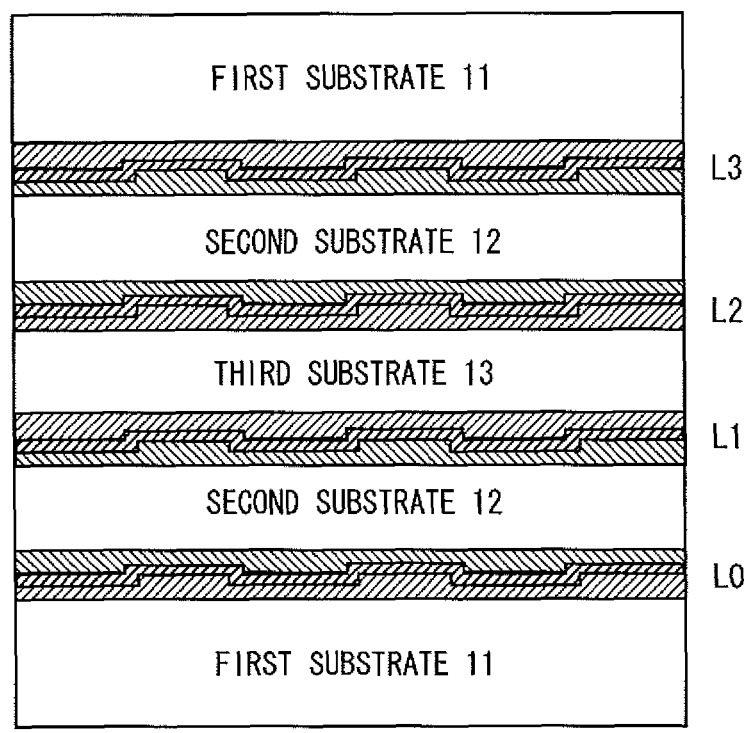
FIG. 9 is a cross sectional view schematically showing the optical information storage medium manufactured by the manufacturing method of the optical information storage medium according to the second exemplary embodiment of the present invention.

Now, as shown in FIG. 8B, the second ultraviolet curable resin 22 is applied to a third substrate 13 of the first structure using the second structure and the first structure manufactured in the first exemplary embodiment. Then, the surface where the information storage layer 42 is formed in the second structure is bonded to the surface where the second ultraviolet curable resin 22 is applied. Further, the second ultraviolet curable resin 22 is spread by a spin coating technique, and then irradiated with ultraviolet rays from outside. Then, the optical information recording medium including four information recording layers (L0 to L3) can be obtained as shown in FIG. 9.

In summary, also in the second exemplary embodiment, the asperity patterns for guiding the laser beams are formed on both sides of the second substrate 12, and the information recording layers 41 and 42 are formed on the asperity patterns. The second substrate 12 where the information recording layers 41 and 42 are formed and the substrates 11 and 13 that are different from the substrate 12 are alternately laminated using the ultraviolet curable resin 22. Also in the second exemplary embodiment, the asperity patterns are manufactured in and transferred to both surfaces of the second substrate 12 substantially at the same time. Thus, even when there is caused any problem in the transfer process, the process can be stopped comparatively at the initial stage of the process. Accordingly, there is no need to perform the wasteful process as in manufacturing of the optical information recording medium of the related art. Accordingly, it is possible to stably provide the multi-layer optical information recording medium which makes it possible to provide a reproduction signal of excellent quality without reducing the yield.

In the optical information storage medium of such a configuration, laser beams transmit through the first substrate 11 and are incident on each of the information storage layers (L0 to L3), thereby achieving recording and reproducing of information. Note that the total thickness of the optical information recording medium including four information recording layers described above is about 208 μm. The optical information storage medium records information to and reproduce information from each information recording layer with the configuration shown in FIG. 25.

Now, when the signals in the information storage layers L0 and L2 are reproduced, the thickness of the second substrate 12 and the asperity patterns of the first ultraviolet curable resins 21 formed on both sides of the second substrate 12 gives an influence on the interlayer crosstalk as the spacer layer as described in the first exemplary embodiment. In this case, the variation of the film thickness of the first ultraviolet curable resin 21 gives an influence on the interlayer crosstalk. Thus, the resin film thickness is preferably within a range from 0.5 μm to 5 μm, as described in the first exemplary embodiment.

On the other hand, when the information storage layer L1 is reproduced, the thickness of the third substrate 13 and the bonding layers of the second ultraviolet curable resins 22 formed on both sides of the third substrate 13 gives an influence on the interlayer crosstalk as the spacer layer as shown in FIG. 9. In such a case, the variation of the film thickness of the second ultraviolet curable resin 22 gives an influence on the first interlayer crosstalk.

Table 2 shows a relation between the bit error rate when the information storage layer L1 is reproduced and the film thickness of each resin when the set film thickness of each of the first ultraviolet curable resin 21 and the second ultraviolet curable resin 22 is changed within the range from 0.5 μm to 6 μm. When the information storage layer L1 is reproduced, the thickness of the spacer layer that gives an influence on the interlayer crosstalk is, as described above, the sum of the film thickness of the third substrate 13 and the film thickness of the asperity patterns formed of the second ultraviolet curable resins 22 arranged on both sides of the third substrate 13. Thus, the thickness of the third substrate 13 is changed within a range from 15 μm to 26 μm in a way that the sum of the film thickness of the third substrate 13 and the film thickness of the asperity patterns formed of the second ultraviolet curable resins 22 arranged on both sides of the third substrate 13 is always equal to 27 μm.

Further, when the optical information recording medium of bond type including four information recording layers described above is employed, the variation of the thickness of the first ultraviolet curable resin 21 is the parameter that gives an influence on the interlayer crosstalk when the signals in the information storage layers L0 and L2 are reproduced. Thus, the thickness of the second substrate 12 is changed within a range from 15 μm to 26 μm in a way that the sum of the film thickness of the second substrate 12 and the film thickness of the asperity patterns formed of the first ultraviolet curable resins 21 arranged on both sides of the second substrate 12 is always equal to 27 μm.

TABLE 2

Relation between each resin film thickness and bit error rate

| First ultraviolet curable resin 21 (μm) | Second ultraviolet curable resin 22 (μm) | Bit error rate |
|---|---|---|
| 0.5 | 0.5 | $8.7 \times 10^{-6}$ |
| 1 | 1 | $1.4 \times 10^{-5}$ |
| 2 | 2 | $3.1 \times 10^{-5}$ |
| 3 | 3 | $3.6 \times 10^{-5}$ |
| 4 | 4 | $7.7 \times 10^{-5}$ |
| 5 | 5 | $1.6 \times 10^{-4}$ |
| 6 | 6 | $3.8 \times 10^{-4}$ |

It can be seen from the measuring result in Table 2 that the bit error rate is low and there is no problem in the signal quality if each resin film thickness is equal to or smaller than 5 μm.

As will be understood from the above description, the variations of the resin film thickness can be made smaller by reducing the thickness of the ultraviolet curable resin film which tends to be a factor of the variations of the film thickness as much as possible. Thus, each film thickness of the first ultraviolet curable resin 21 and the second ultraviolet curable resin 22 is preferably within a range from 0.5 μm to 5 μm.

As stated above, in the second exemplary embodiment, most part of the film thickness in the spacer layers between information recording layers that gives an influence on the interlayer crosstalk or the spherical aberration is formed of the PC film substrate with small thickness and little variation in film thickness. Further, the pit or the asperity patterns for guiding the laser beams or the bonding resin between layers is formed of the ultraviolet curable resin of 5 μm or less. Accordingly, a reproduction signal with high signal quality can be obtained in each information recording layer.

In the second exemplary embodiment as well, a thin substrate having a thickness of about 100 μm is used as the first substrate in place of the thick substrate having a thickness of 600 μm or 1200 μm that is typically used. A plurality of information recording layers are sequentially laminated on the substrate. Hence, the number of optical information recording media that can be stored in the cartridge of the same capacity dramatically increases. Accordingly, the storage capacity per unit volume can be dramatically increased, thereby easily achieving an increase in the capacity of the optical disk system.

Third Exemplary Embodiment

Now, as a third exemplary embodiment, a manufacturing process of an optical information recording medium including four information recording layers that are different from those of the second exemplary embodiment will be described. Note that, in the third exemplary embodiment, the optical information storage medium is composed of a third structure and a fourth structure.

In the third exemplary embodiment, a polycarbonate stamper (PC stamper) is used as a mold. The PC stamper is mass-replicated by injection molding. A first substrate is arranged in the lowermost layer. A flat polycarbonate substrate (PC substrate) having no asperity pattern formed thereon is used as the first substrate. The first substrate has the thickness of 100 μm. A second substrate has asperity patterns formed on both surfaces thereof (upper and lower surfaces) with an ultraviolet curable resin interposed therebetween. A polycarbonate film substrate (PC film substrate) is used as the second substrate. The second substrate has a thickness of 25 μm. A polycarbonate film substrate (PC film substrate) is used as a third substrate which is other substrate than the first and second substrates. The third substrate has a thickness of 25 μm. Further, the film thickness of each of a first ultraviolet curable resin 21 and a second ultraviolet curable resin 22 is set to 1 μm. In the third exemplary embodiment as well, the ultraviolet curable resin applied to form the asperity patterns on both sides of the second substrate is called a first ultraviolet curable resin, and another ultraviolet curable resin is called a second ultraviolet curable resin.

Hereinafter, a procedure of manufacturing the optical information storage medium is shown with reference to FIGS. 10 to 15.

Figure 10A:
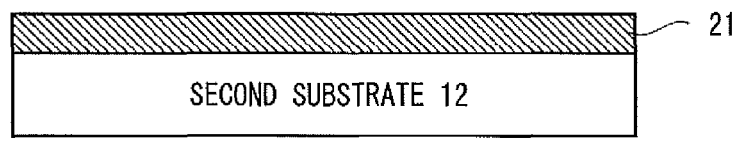
FIG. 10A is a process diagram showing a manufacturing method of an optical information storage medium according to a third exemplary embodiment of the present invention.
Figure 10B:
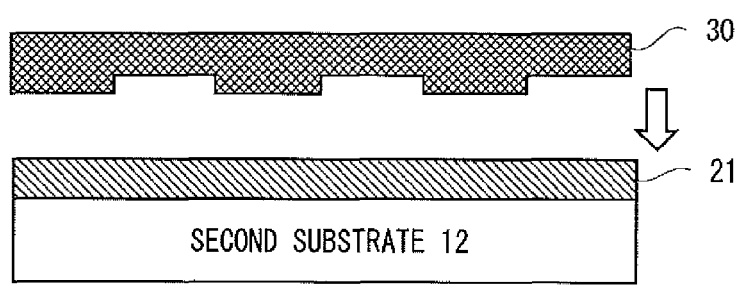
FIG. 10B is a process diagram showing the manufacturing method of the optical information storage medium according to the third exemplary embodiment of the present invention.
Figure 10C:
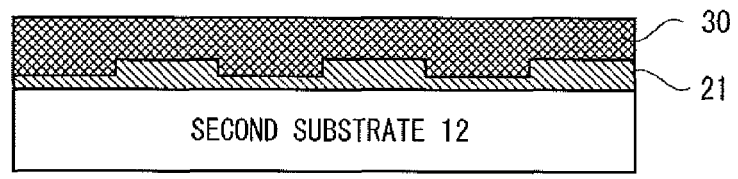
FIG. 10C is a process diagram showing the manufacturing method of the optical information storage medium according to the third exemplary embodiment of the present invention.

First, as shown in FIG. 10A, a first ultraviolet curable resin 21 is applied to one surface of a second substrate 12. Then, as shown in FIGS. 10B and 10C, a mold 30 is bonded to the surface where the first ultraviolet curable resin 21 is applied. In the mold 30, a fine pattern is formed in advance. Further, the first ultraviolet curable resin 21 is spread by a spin coating technique, and then irradiated with ultraviolet rays from outside.

Figure 10D:
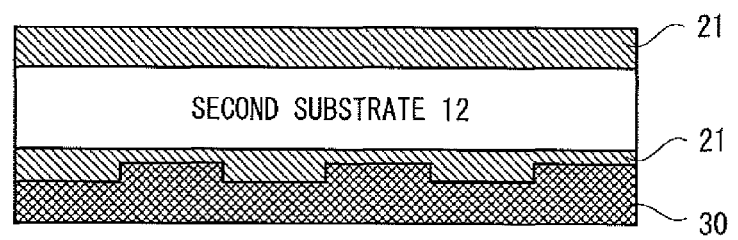
FIG. 10D is a process diagram showing the manufacturing method of the optical information storage medium according to the third exemplary embodiment of the present invention.
Figure 11A:
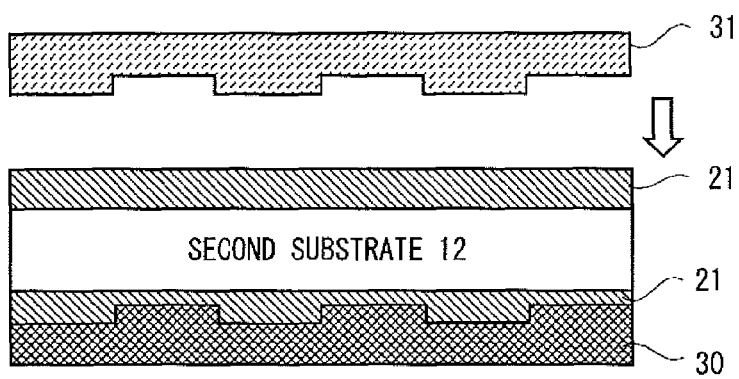
FIG. 11A is a process diagram showing the manufacturing method of the optical information storage medium according to the third exemplary embodiment of the present invention.
Figure 11B:
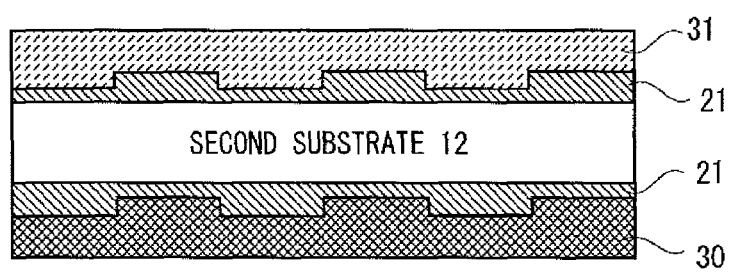
FIG. 11B is a process diagram showing the manufacturing method of the optical information storage medium according to the third exemplary embodiment of the present invention.

Next, as shown in FIG. 10D, the first ultraviolet curable resin 21 is also applied to the other surface of the second substrate 12. Then, as shown in FIGS. 11A and 11B, another mold 31 is bonded to the surface where the first ultraviolet curable resin 21 is applied. In the mold 31, a fine pattern is formed in advance. Further, the first ultraviolet curable resin 21 is spread by a spin coating technique, and then irradiated with ultraviolet rays from outside.

Figure 11C:
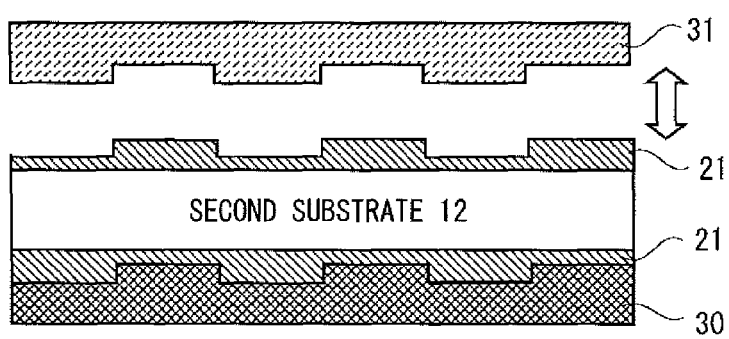
FIG. 11C is a process diagram showing the manufacturing method of the optical information storage medium according to the third exemplary embodiment of the present invention.
Figure 11D:
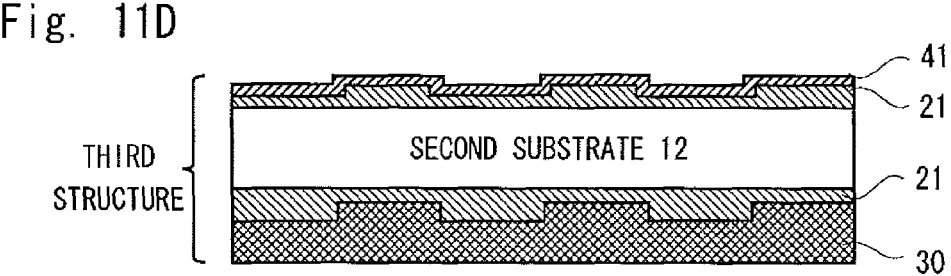
FIG. 11D is a process diagram showing the manufacturing method of the optical information storage medium according to the third exemplary embodiment of the present invention.

Next, as shown in FIG. 11C, one mold 31 is separated at a boundary with the first ultraviolet curable resin 21 to transfer the asperity pattern. Then, as shown in FIG. 11D, an information storage layer 41 is formed on the surface where the asperity pattern is transferred, so as to manufacture the third structure. Further, the above process is repeated again, so as to manufacture another third structure.

Figure 12A:
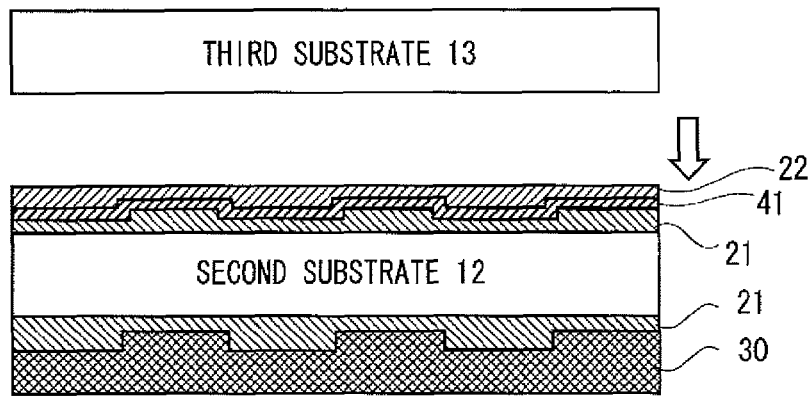
FIG. 12A is a process diagram showing the manufacturing method of the optical information storage medium according to the third exemplary embodiment of the present invention.
Figure 12B:
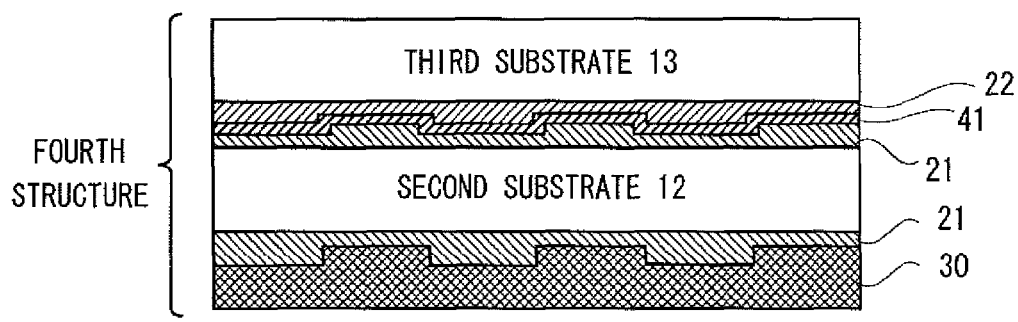
FIG. 12B is a process diagram showing the manufacturing method of the optical information storage medium according to the third exemplary embodiment of the present invention.

Next, as shown in FIG. 12A, a second ultraviolet curable resin 22 is applied to the surface where the information storage layer 41 is formed in one third structure. Then, as shown in FIG. 12B, a third substrate 13 is bonded to the surface where the second ultraviolet curable resin 22 is applied. Further, the second ultraviolet curable resin 22 is spread by a spin coating technique, and then irradiated with ultraviolet rays from outside to manufacture the fourth structure.

Figure 12C:
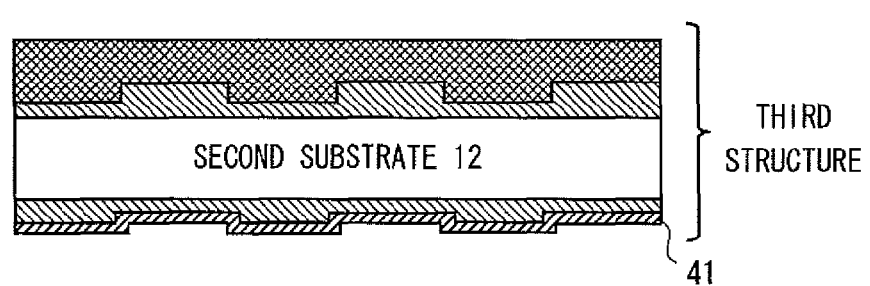
FIG. 12C is a process diagram showing the manufacturing method of the optical information storage medium according to the third exemplary embodiment of the present invention.
Figure 12C:
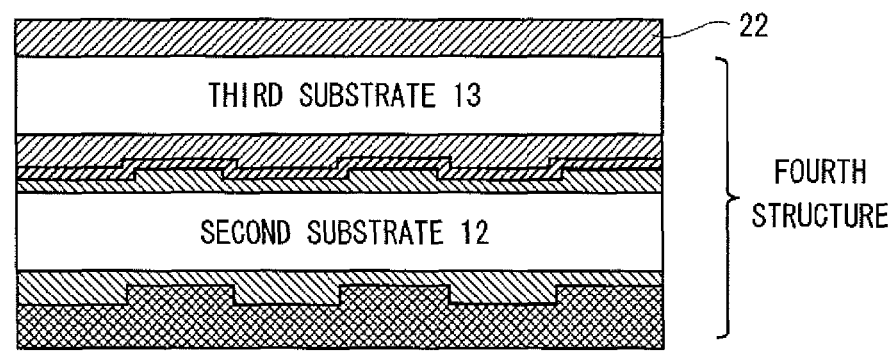
Figure 13A:
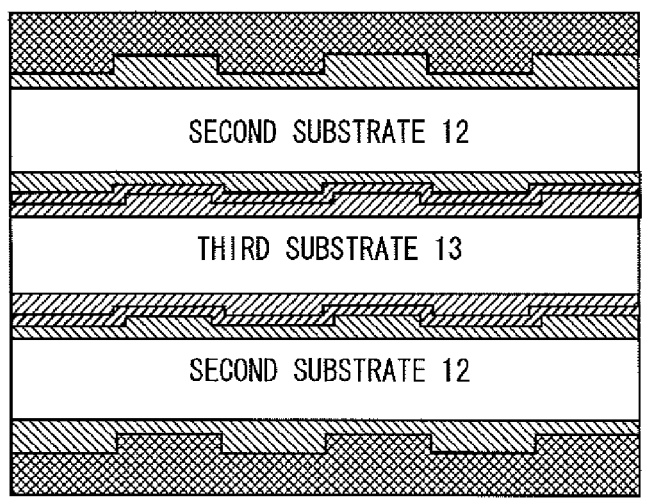
FIG. 13A is a process diagram showing the manufacturing method of the optical information storage medium according to the third exemplary embodiment of the present invention.

Next, as shown in FIG. 12C, the second ultraviolet curable resin 22 is applied to the third substrate 13 of the fourth structure. Then, as shown in FIG. 13A, the surface where the information storage layer 41 is formed in the third structure on the other side is bonded to the surface where the second ultraviolet curable resin 22 is applied. Further, the second ultraviolet curable resin 22 is spread by a spin coating technique, and then irradiated with ultraviolet rays from outside.

Figure 13B:
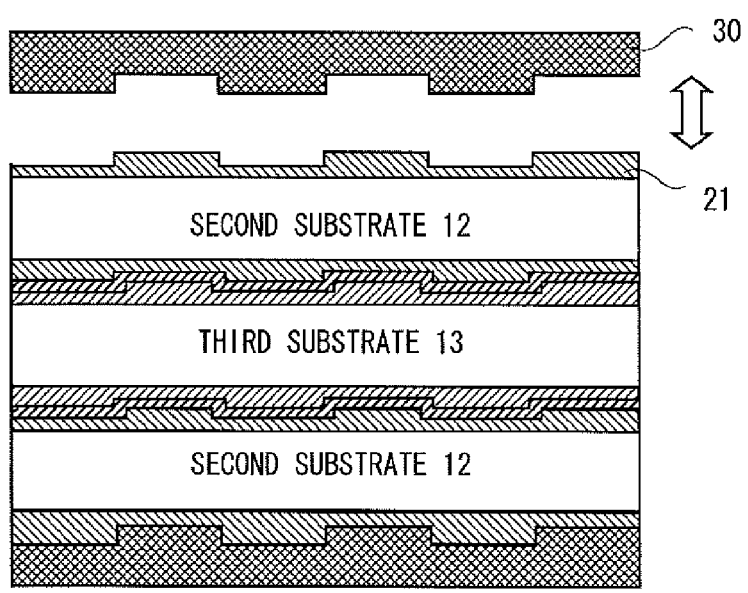
FIG. 13B is a process diagram showing the manufacturing method of the optical information storage medium according to the third exemplary embodiment of the present invention.
Figure 13C:
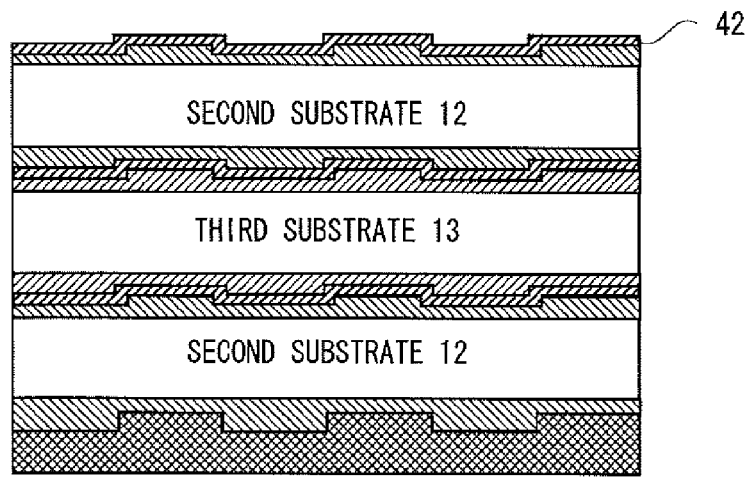
FIG. 13C is a process diagram showing the manufacturing method of the optical information storage medium according to the third exemplary embodiment of the present invention.

Next, as shown in FIG. 13B, the mold 30 that remains on the side of the third structure on the other side is separated at a boundary with the first ultraviolet curable resin 21 to transfer the asperity pattern. Then, as shown in FIG. 13C, an information storage layer 42 is formed on the surface where the asperity pattern is transferred.

Figure 14A:
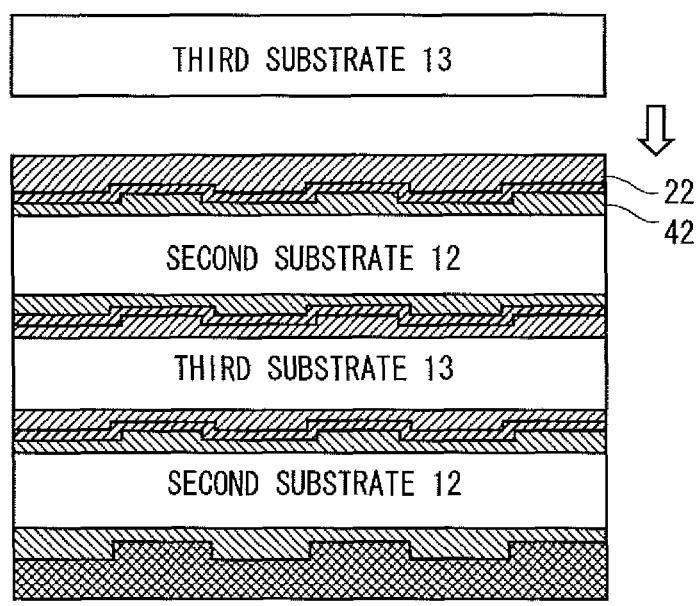
FIG. 14A is a process diagram showing the manufacturing method of the optical information storage medium according to the third exemplary embodiment of the present invention.
Figure 14B:
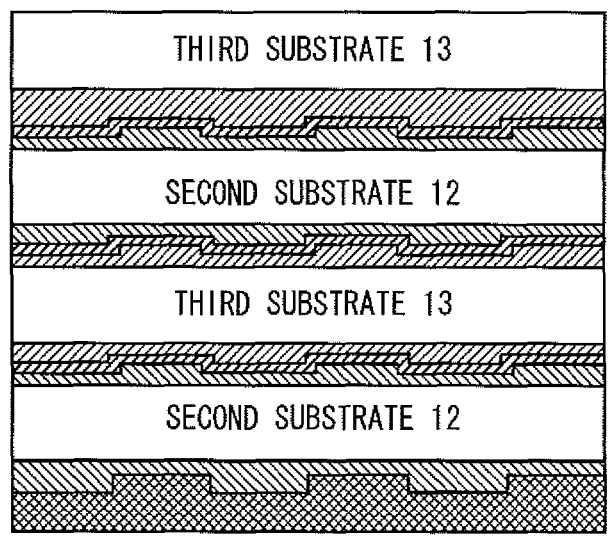
FIG. 14B is a process diagram showing the manufacturing method of the optical information storage medium according to the third exemplary embodiment of the present invention.

Next, the second ultraviolet curable resin 22 is applied to the surface where the information storage layer 42 is formed, as shown in FIG. 14A. Then, as shown in FIG. 14B, a third substrate 13 is bonded to the surface where the second ultraviolet curable resin 22 is applied. Further, the second ultraviolet curable resin 22 is spread by a spin coating technique, and then irradiated with ultraviolet rays from outside.

Figure 14C:
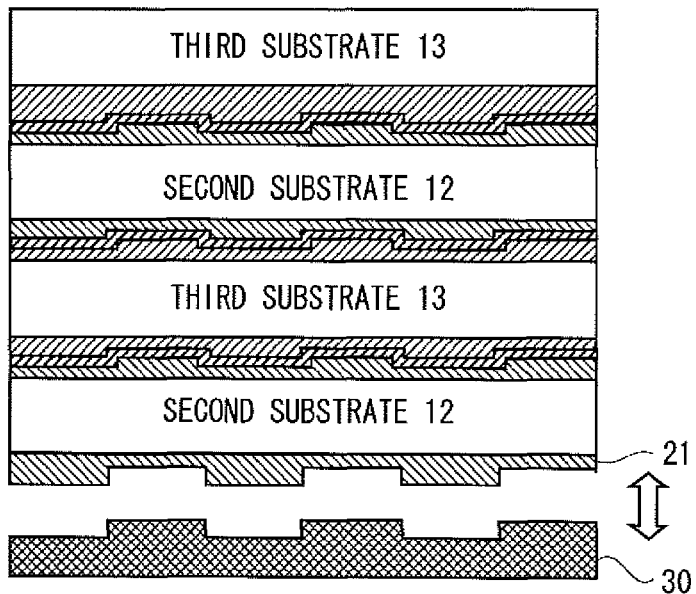
FIG. 14C is a process diagram showing the manufacturing method of the optical information storage medium according to the third exemplary embodiment of the present invention.
Figure 15A:
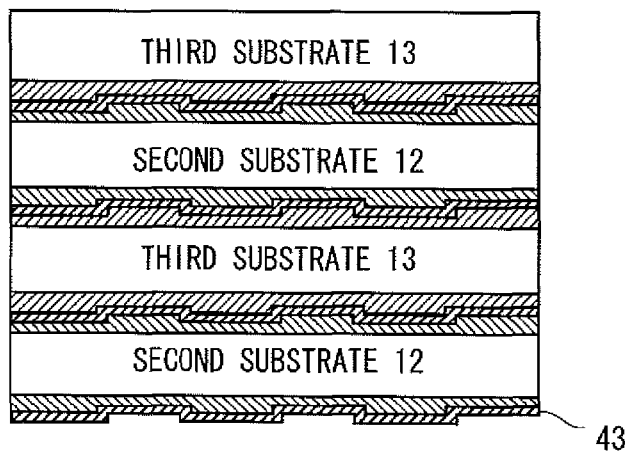
FIG. 15A is a process diagram showing the manufacturing method of the optical information storage medium according to the third exemplary embodiment of the present invention.

Next, as shown in FIG. 14C, the mold 30 that remains on the side of the fourth structure is separated at a boundary with the first ultraviolet curable resin 21 to transfer the asperity pattern. Then, as shown in FIG. 15A, an information storage layer 43 is formed on the surface where the asperity pattern is formed.

Figure 15B:
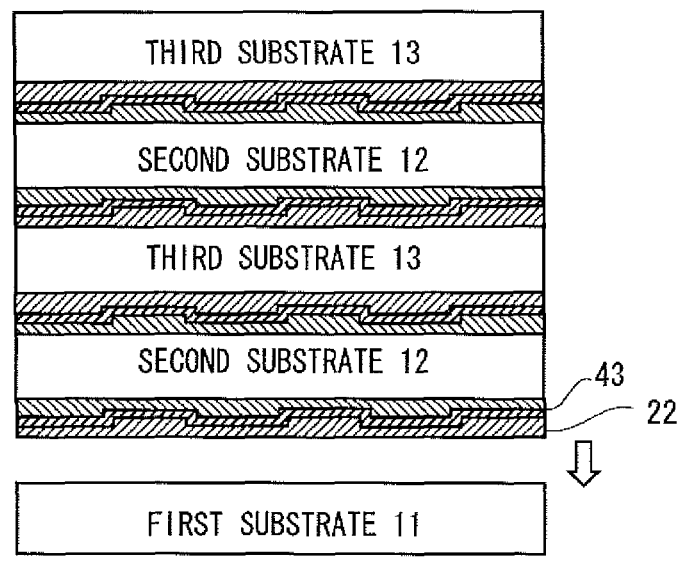
FIG. 15B is a process diagram showing the manufacturing method of the optical information storage medium according to the third exemplary embodiment of the present invention.
Figure 15C:
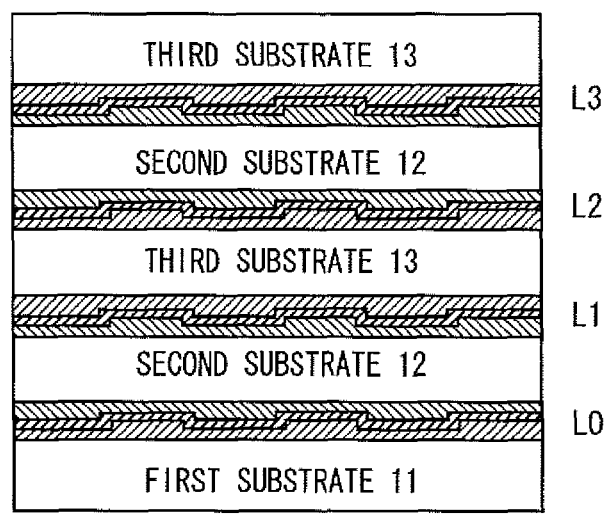
FIG. 15C is a cross sectional view schematically showing the optical information storage medium manufactured by the manufacturing method of the optical information storage medium according to the third exemplary embodiment of the present invention.

Next, as shown in FIG. 15B, the second ultraviolet curable resin 22 is applied to the surface where the information storage layer 43 is formed. Then, as shown in FIG. 15C, the first substrate 11 is bonded to the surface where the second ultraviolet curable resin 22 is applied. Further, the second ultraviolet curable resin 22 is spread by spin coating technique, and then irradiated with ultraviolet rays from outside. As a result, the optical information recording medium that includes four information recording layers (L0 to L3) can be obtained.

In short, also in the third exemplary embodiment, the asperity patterns for guiding the laser beams are formed on the both sides of the second substrate 12, and the information recording layers 41 and 42 are formed on the asperity patterns. The second substrate 12 where the information recording layers 41 and 42 are formed and a substrate that is different from the substrate 12 are alternately laminated using the ultraviolet curable resin. In this way, also in the third exemplary embodiment, the asperity patterns are manufactured in and transferred to the both sides of the second substrate 12 substantially at the same time. Thus, even when there is caused any problem in the transfer process, the process can be stopped comparatively at the initial stage of the process. Accordingly, there is no need to perform the wasteful process as in manufacturing of the optical information recording medium of the related art. Accordingly, it is possible to stably provide the multi-layer optical information recording medium which makes it possible to provide a reproduction signal of excellent quality without reducing the yield.

In the optical information storage medium of such a configuration, laser beams transmit through the first substrate 11 and are incident on each of the information storage layers L0 to L3, thereby achieving recording and reproducing of the information. Note that the total thickness of the optical information recording medium having the four information recording layers described above is about 208 μm. In the optical information storage medium, information is recorded to and reproduced from each information recording layer with the configuration shown in FIG. 25. The bit error rate when each of the information storage layers L0 to L3 of the optical information storage medium shown in FIG. 15C is reproduced is within the range from $1.2 \times 10^{-5}$ to $1.5 \times 10^{-5}$. Accordingly, it is confirmed that no problem occurs in the optical information storage medium manufactured by the process described in the third exemplary embodiment.

In this exemplary embodiment as well, most part of the film thickness in the spacer layers between information recording layers that gives an influence on the interlayer crosstalk or the spherical aberration is formed of the PC film substrate with small thickness and little variation in film thickness. Further, the pit or the asperity patterns for guiding the laser beams and the bonding resin between layers are formed of the ultraviolet curable resin of 5 μm or less. Accordingly, it is possible to obtain the reproduction signal with high signal quality in each information recording layer.

Further, in the third exemplary embodiment as well, a thin substrate having a thickness of about 100 μm is used as the first substrate in place of the thick substrate of 600 μm or 1200 μm which has been conventionally used. A plurality of information recording layers are sequentially laminated on the substrate. This makes it possible to drastically increase the number of optical information recording media which can be contained in the cartridge with the same capacity. Accordingly, it is possible to drastically increase the storage capacity per unit volume, thereby easily achieving an increase in the capacity of the optical disk system.

Fourth Exemplary Embodiment

Next, as a fourth exemplary embodiment, a procedure of manufacturing an optical information recording medium including a multi-layered information recording layer that is different from that of the first to third exemplary embodiments will be described.

In the fourth exemplary embodiment, a polycarbonate stamper (PC stamper) is used as a mold. The PC stamper is mass-replicated by injection molding. A first substrate is arranged in the lowermost layer. A flat polycarbonate substrate (PC substrate) having no asperity pattern formed on the surface thereof is used as the first substrate. The first substrate has a thickness of 100 μm. A second substrate has asperity patterns formed on both surfaces thereof (upper surface and lower surface) with an ultraviolet curable resin interposed therebetween. A polycarbonate film substrate (PC film substrate) is used as the second substrate. The second substrate has a thickness of 25 μm. A polycarbonate film substrate (PC film substrate) is used as a third substrate which is other substrate than first and second substrates. The third substrate has a thickness of 25 μm. Further, the film thickness of each of a first ultraviolet curable resin 21 and a second ultraviolet curable resin 22 is set to 1 μm. In the fourth exemplary embodiment as well, the ultraviolet curable resin applied to form the asperity patterns on the both surfaces of the second substrate is called a first ultraviolet curable resin, and another ultraviolet curable resin is called a second ultraviolet curable resin.

Hereinafter, the procedure of manufacturing the optical information storage medium is described with reference to FIGS. 16 to 19.

Figure 16A:
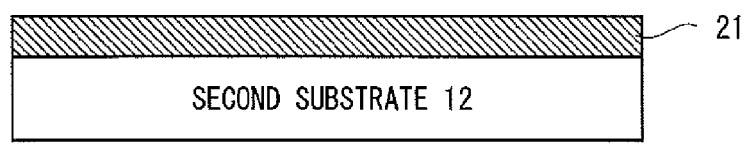
FIG. 16A is a process diagram showing a manufacturing method of an optical information storage medium according to a fourth exemplary embodiment of the present invention.
Figure 16B:
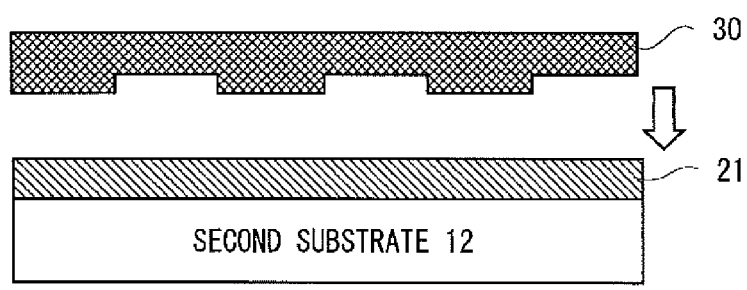
FIG. 16B is a process diagram showing the manufacturing method of the optical information storage medium according to the fourth exemplary embodiment of the present invention.
Figure 16C:
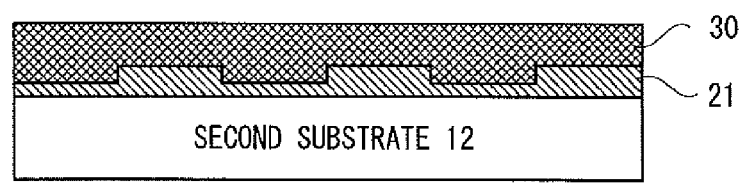
FIG. 16C is a process diagram showing the manufacturing method of the optical information storage medium according to the fourth exemplary embodiment of the present invention.

First, as shown in FIG. 16A, a first ultraviolet curable resin 21 is applied to one surface of a second substrate 12. Then, as shown in FIGS. 16B and 16C, a mold 30 is bonded to the surface where the first ultraviolet curable resin 21 is applied. In the mold 30, a fine pattern is formed in advance. Further, the first ultraviolet curable resin 21 is spread by a spin coating technique, and then irradiated with ultraviolet rays from outside.

Figure 16D:
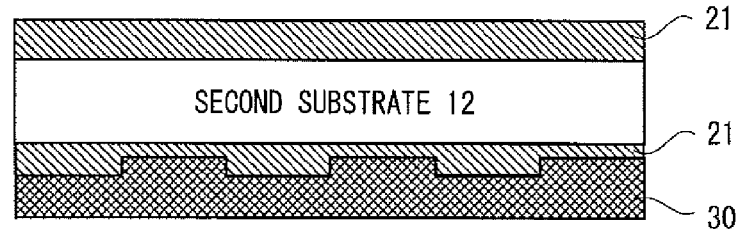
FIG. 16D is a process diagram showing the manufacturing method of the optical information storage medium according to the fourth exemplary embodiment of the present invention.
Figure 17A:
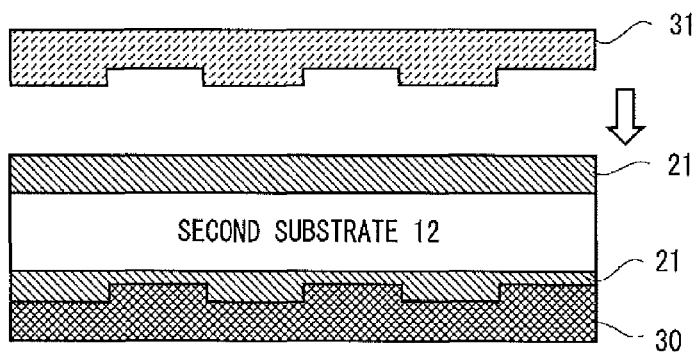
FIG. 17A is a process diagram showing the manufacturing method of the optical information storage medium according to the fourth exemplary embodiment of the present invention.
Figure 17B:
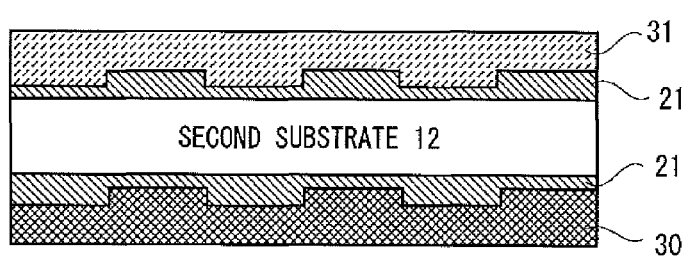
FIG. 17B is a process diagram showing the manufacturing method of the optical information storage medium according to the fourth exemplary embodiment of the present invention.

Next, as shown in FIG. 16D, the first ultraviolet curable resin 21 is applied to the other surface of the second substrate 12. Then, as shown in FIGS. 17A and 17B, another mold 31 is bonded to the surface where the first ultraviolet curable resin 21 is applied. In the mold 31, a fine pattern is formed in advance. Further, the first ultraviolet curable resin 21 is spread by a spin coating technique, and then irradiated with ultraviolet rays from outside.

Figure 17C:
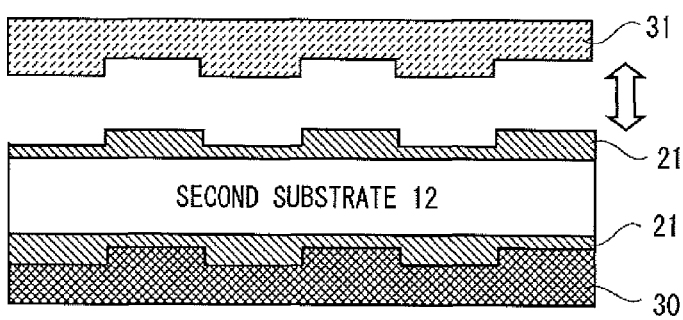
FIG. 17C is a process diagram showing the manufacturing method of the optical information storage medium according to the fourth exemplary embodiment of the present invention.
Figure 17D:
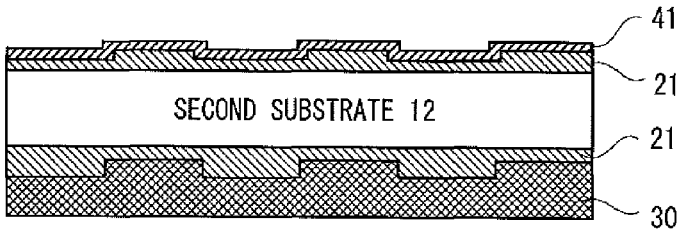
FIG. 17D is a process diagram showing the manufacturing method of the optical information storage medium according to the fourth exemplary embodiment of the present invention.

Next, as shown in FIG. 17C, one mold 31 is separated at a boundary with the first ultraviolet curable resin 21 to transfer the asperity pattern. Then, as shown in FIG. 17D, an information storage layer 41 is formed on the surface where the asperity pattern is transferred.

Figure 18A:
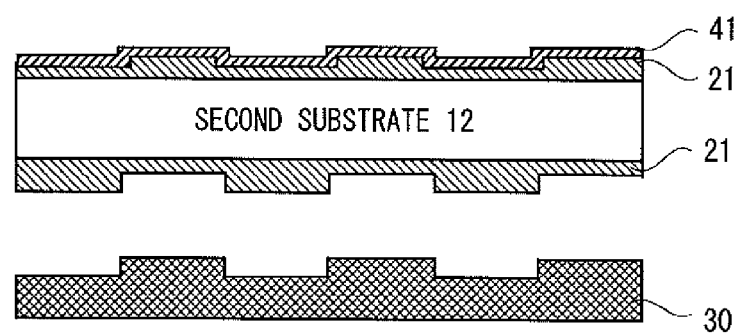
FIG. 18A is a process diagram showing the manufacturing method of the optical information storage medium according to the fourth exemplary embodiment of the present invention.
Figure 18B:
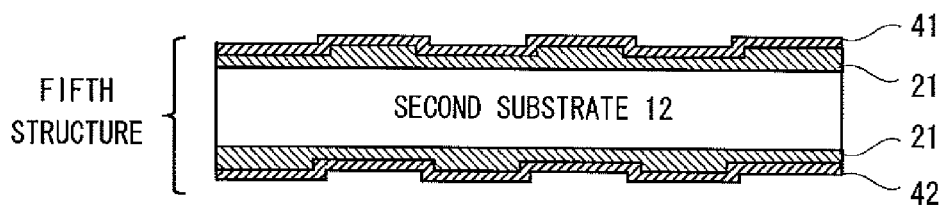
FIG. 18B is a process diagram showing the manufacturing method of the optical information storage medium according to the fourth exemplary embodiment of the present invention.

Next, as shown in FIG. 18A, the mold 30 that remains in the second substrate 12 is separated at a boundary with the first ultraviolet curable resin 21 to transfer the asperity pattern. Then, as shown in FIG. 18B, an information storage layer 42 is formed on the surface where the asperity pattern is transferred.

The process described above is repeatedly performed for multiple times, so as to manufacture a plurality of fifth structures. In the fifth structure, the asperity patterns are formed by the first ultraviolet curable resins 21 on both surfaces of the second substrate 12. The information storage layers 41 and 42 are further formed thereon.

Figure 19:
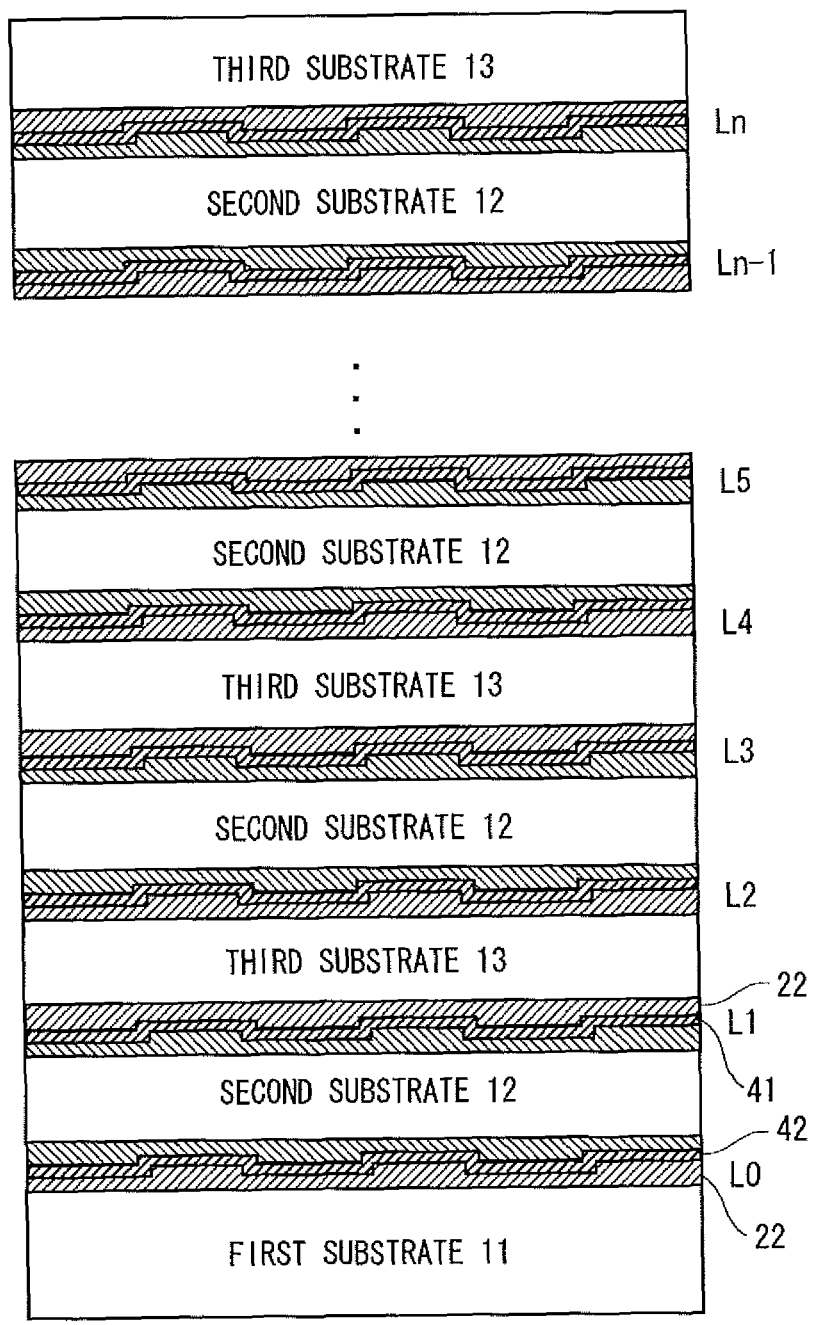
FIG. 19 is a cross sectional view schematically showing the optical information storage medium manufactured by the manufacturing method of the optical information storage medium according to the fourth exemplary embodiment of the present invention.
Figure 20:
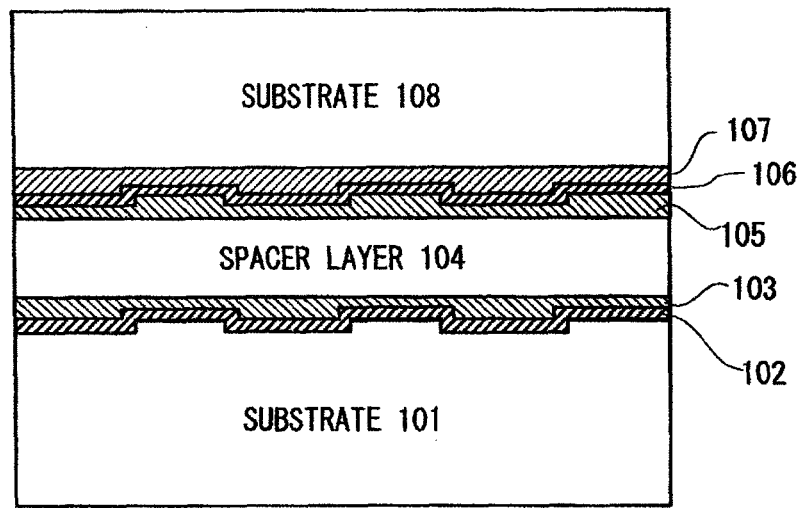
FIG. 20 is a cross sectional view schematically showing an optical information storage medium including two information storage layers according to a related art.
Figure 21:
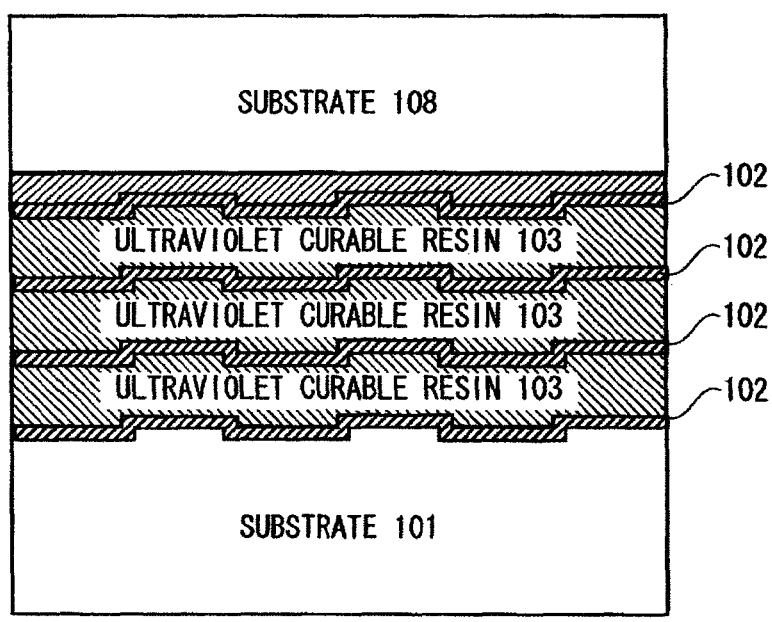
FIG. 21 is a cross sectional view schematically showing an optical information storage medium including four information storage layers according to a related art.

Next, as shown in FIG. 19, the fifth structure and the third substrate 13 are alternately laminated and bonded for a plurality of times on the first substrate 11 with the second ultraviolet curable resin 22 interposed therebetween. More specifically, the second ultraviolet curable resin 22 is applied to the first substrate 11, and the surface where the information storage layer 42 (or information storage layer 41) in the fifth structure is formed is bonded to the surface where the second ultraviolet curable resin 22 is applied. Further, the second ultraviolet curable resin 22 is spread by a spin coating technique, and then irradiated with ultraviolet rays from outside.

Further, the second ultraviolet curable resin 22 is applied to the surface where the information storage layer (or information storage layer 42) on the other side of the fifth structure is formed, and the third substrate 13 is bonded to the surface where the second ultraviolet curable resin 22 is applied. Further, the second ultraviolet curable resin 22 is spread by a spin coating technique, and then irradiated with ultraviolet rays from outside. Further, the fifth structure and the third substrate 13 are alternately laminated and bonded for a plurality of times on the third substrate 13 with the second ultraviolet curable resin 22 interposed therebetween. As a result, the optical information recording medium including a plurality of information recording layers can be obtained.

In summary, also in the fourth exemplary embodiment, the asperity patterns for guiding the laser beams are formed on both sides of the second substrate 12, and the information recording layers 41 and 42 are formed on the asperity patterns. The second substrate 12 in which the information recording layers 41 and 42 are arranged and a substrate which is different from the substrate 12 are alternately laminated using the ultraviolet curable resin. Also in the fourth exemplary embodiment, the asperity patterns are manufactured in and transferred on both surfaces of the second substrate 12 substantially at the same time. Thus, even when there is caused any problem in the transfer process, the process can be stopped comparatively at the initial stage of the process. Accordingly, there is no need to perform the wasteful process as in manufacturing of the optical information recording medium of the related art. Accordingly, it is possible to stably provide the multi-layer optical information recording medium which makes it possible to provide a reproduction signal of excellent quality without reducing the yield.

In the optical information storage medium of such a configuration, laser beams transmit through the first substrate 11 and are incident on each of the information storage layers L0 to Ln, so as to perform recording and reproducing of the information. Also in the optical information recording medium including multiple information recording layers described above, the information is recorded to and reproduced from each of the information recording layers with the configuration shown in FIG. 25.

In this exemplary embodiment as well, most part of the film thickness in the spacer layers between information recording layers that gives an influence on the interlayer crosstalk or the spherical aberration is formed of a thin PC film substrate with little variation in film thickness. Further, the pit or the asperity patterns for guiding the laser beams or the bonding resin between layers is formed of the ultraviolet curable resin of 5 μm or less. Accordingly, it is possible to obtain the reproduction signal with high signal quality in each of the information recording layers. In summary, the range of the film thickness of each of the first ultraviolet curable resin 21 and the second ultraviolet curable resin 22 is equal to the range described in the first to third exemplary embodiments, which means there is no difference between them.

In the fourth exemplary embodiment as well, a thin substrate having a thickness of about 100 μm is used as the first substrate in place of the substrate having a thickness of 600 μm or 1200 μm which has been conventionally used. Then, the plurality of information recording layers are sequentially laminated on the substrate. Thus, the number of optical information recording media that can be contained in the cartridge having the same capacity is drastically increased. Accordingly, the storage capacity per unit volume can be dramatically increased, and an increase in the capacity of the optical disk system can be readily realized.

Note that, after laminating and bonding the fifth structure and the third substrate 13 for a plurality of times with the second ultraviolet curable resin 22 interposed therebetween, the first substrate 11 may be bonded with the second ultraviolet curable resin 22 interposed therebetween.

The first exemplary embodiment to fourth exemplary embodiment stated above show the case in which a PC film substrate having a thickness of 100 μm is used as the first substrate 11 in order to minimize the thickness of each optical disk medium. However, a substrate within the range from 90 μm to 1200 μm may be used as the first substrate 11 as required. When an optical head of the optical system with the numerical aperture (NA) of 0.85 is used, a PC film substrate with the thickness from 90 μm to 110 μm may be used as the first substrate by the optical system shown in FIG. 25. Further, even when the optical head of the optical system with the NA of 0.85 is used, a plurality of information recording layers may be laminated on the substrate having a thickness of 1100

μm as in the optical disk medium of Blue-ray type that has already been produced, and a PC film substrate having a thickness of from 90 μm to 110 μm may be lastly used as the substrate in the side on which the laser beams are incident. Further, when the optical head of the optical system with the NA of 0.65 is used, the disk rotation stabilizing plate (0.5 mmt) shown in FIG. 25 is arranged in the side of the optical head and a spacer of about 0.2 mm is arranged between the optical disk medium and the stabilizing plate, so as to be able to use the PC film substrate with the thickness from 90 μm to 110 μm as the first substrate.

Each thickness of the second substrate and the third substrate described in the above first exemplary embodiment to the fourth exemplary embodiment is not limited to the above-described value. In other words, the thickness may be selected as appropriate in accordance with the capacity of the spherical aberration correction mechanism of the optical head that is employed. For example, it is possible to use the second substrate having the thickness of 100 μm to form the asperity patterns on both sides of the second substrate using the first ultraviolet curable resin. Further, the third substrate may have a function as the spacer layer, or may be formed in the outermost surface of the optical disk medium. In this case, the thickness of the substrate is not limited to the above-described value. For example, a substrate having a relatively large thickness of 100 μm may be employed in the outermost surface. However, in a part where the third substrate serves as the spacer layer, the thickness is selected as appropriate according to the capacity of the spherical aberration correction mechanism of the optical head that is used.

Each process of bonding described in the first exemplary embodiment to the fourth exemplary embodiment above is carried out by the in-vacuum bonding method. In short, centering of each bonding substrate is performed. Then each bonding substrate is bonded in a vacuum. The substrate is irradiated with ultraviolet rays from outside with this state, so as to cure the ultraviolet curable resin. However, it has been already confirmed that, also with the method of performing centering and bonding in the air, the bonding can be completed with no problem by bonding substrates without including air bubbles in the ultraviolet curable resin applied to the surface where the substrates are bonded in the bonding process.

As described above, in the optical information recording medium including a multi-layered information recording layer, as the spacer layers between information recording layers that give an influence on the interlayer crosstalk or spherical aberration, most of the film thickness is formed of a PC film substrate with small thickness and with little variation in film thickness. Further, the pit or asperity pattern for guiding laser beams or bonding resin between layers is formed of the ultraviolet curable resin with 5 μm or less. Accordingly, it is possible to obtain the reproduction signal with excellent signal quality in each information recording layer.

Further, the above-described embodiments are different from the conventional manufacturing method of the multi-layer optical information recording medium in which the information recording layers are sequentially laminated on the substrate. In other words, structures in which the asperity patterns or information recording layers are formed are combined as appropriate, so as to manufacture the optical information recording medium with multi-layer structure. Accordingly, it is possible to improve the yield and to suppress the loss of the manufacturing member.

Although the present invention has been described with reference to the exemplary embodiments, it should not be limited by the description stated above. The configuration and the detail of the present invention may be variously changed in a way that can be understood by a person skilled in the art within the scope of the present invention.

This application is based upon and claims the benefit of priority from Japanese patent application No. 2008-271826, filed on Oct. 22, 2008, the disclosure of which is incorporated herein in its entirety by reference.

INDUSTRIAL APPLICABILITY

The present invention can be applied to an optical information medium irradiated with laser beams to optically record or reproduce information and a method of manufacturing the same.

| | Reference Signs List |
|---|---|
| 11 | FIRST SUBSTRATE |
| 12 | SECOND SUBSTRATE |
| 13 | THIRD SUBSTRATE |
| 21, 22 | ULTRAVIOLET CURABLE RESIN |
| 30, 31 | MOLD |
| 41, 41, 43 | INFORMATION STORAGE LAYER |
| 101 | SUBSTRATE |
| 102 | INFORMATION STORAGE LAYER |
| 103, 105, 107 | ULTRAVIOLET CURABLE RESIN |
| 104 | SPACER LAYER |
| 106 | INFORMATION RECORDING LAYER |
| 108 | SUBSTRATE |

The invention claimed is:

1. A method of manufacturing an optical information recording medium, comprising:
   manufacturing a second structure by:
   a process of applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside;
   a process of applying the first ultraviolet curable resin to another surface of the second substrate, bonding another mold having a fine pattern formed therein in advance to the another surface where the first ultraviolet curable resin is applied, spreading the first ultraviolet curable resin by a spin coating technique, and then irradiating the first ultraviolet curable resin with ultraviolet rays from outside;
   a process of separating any one of the molds at a boundary with the first ultraviolet curable resin to transfer an asperity pattern, so as to form an information storage layer on the transfer surface of the asperity pattern;
   a process of applying a second ultraviolet curable resin to the surface where the information storage layer is formed, bonding a first substrate to the surface where the second ultraviolet curable resin is applied, spreading the second ultraviolet curable resin by a spin coating technique, and irradiating the second ultraviolet curable resin with ultraviolet rays from outside; and
   a process of separating the mold that remains in the second substrate at a boundary with the first ultraviolet curable resin, so as to form an information storage layer on the transfer surface of the asperity pattern; and
   applying the second ultraviolet curable resin to a third substrate of a first structure, bonding a surface where the information storage layer is formed in the second structure to the surface of the first structure where the second ultraviolet curable resin is applied, spreading the second ultraviolet curable resin by a spin coating technique, and then irradiating the second ultraviolet curable resin with ultraviolet rays from outside, wherein the first structure is manufactured by:

forming asperity patterns for guiding laser beams on both sides of a second substrate;

forming information recording layers on the asperity patterns;

bonding a first substrate to a surface where one information storage layer is formed in the second substrate with the second ultraviolet curable resin formed therebetween; and bonding the third substrate to a surface where another information storage layer is formed in the second substrate with the second ultraviolet curable resin formed therebetween.

2. A method of manufacturing an optical information recording medium, comprising:

manufacturing two third structures by a process of applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of applying a first ultraviolet curable resin to another surface of the second substrate, bonding another mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; and a process of separating any one of the molds at a boundary with the first ultraviolet curable resin to transfer an asperity pattern, so as to form an information storage layer on the transfer surface of the asperity pattern;

manufacturing a fourth structure by applying a second ultraviolet curable resin to the surface where the information storage layer is formed in one of the third structures, bonding a third substrate to the surface where the second ultraviolet curable resin is applied, spreading the second ultraviolet curable resin by a spin coating technique, and then irradiating the second ultraviolet curable resin with ultraviolet rays from outside;

applying a second ultraviolet curable resin to a third substrate of the fourth structure, bonding the surface where the information storage layer is formed in the third structure in another side to the surface where the second ultraviolet curable resin is applied, spreading the second ultraviolet curable resin by a spin coating technique, and then irradiating the second ultraviolet curable resin with ultraviolet rays from outside;

separating the mold that remains in the side of the third structure in another side at a boundary with the first ultraviolet curable resin, so as to form an information storage layer on the transfer surface of the asperity pattern;

applying a second ultraviolet curable resin to the surface where the information storage layer is formed, bonding a third substrate to the surface where the second ultraviolet curable resin is applied, spreading the second ultraviolet curable resin by a spin coating technique, and then irradiating the second ultraviolet curable resin with ultraviolet rays from outside;

separating the mold that remains in the side of the fourth structure at a boundary with the first ultraviolet curable resin to transfer an asperity pattern, so as to form an information storage layer on the transfer surface of the asperity pattern; and applying the second ultraviolet curable resin to the surface where the information storage layer is formed, bonding a first substrate to the surface where the second ultraviolet curable resin is applied, spreading the second ultraviolet curable resin by a spin coating technique, and then irradiating the second ultraviolet curable resin with ultraviolet rays from outside.

3. A method of manufacturing an optical information recording medium comprising:

repeatedly performing a process of applying a first ultraviolet curable resin to one surface of a second substrate, bonding a mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of applying a first ultraviolet curable resin to another surface of the second substrate, bonding another mold having a fine pattern formed therein in advance to the surface where the first ultraviolet curable resin is applied, spreading the first ultraviolet curable resin by a spin coating technique, and then irradiating the first ultraviolet curable resin with ultraviolet rays from outside; a process of separating any of the molds at a boundary with the first ultraviolet curable resin to transfer an asperity pattern, so as to form an information storage layer on the transfer surface of the asperity pattern; and a process of separating the mold that remains in the second substrate at a boundary with the first ultraviolet curable resin to transfer the asperity pattern, so as to form an information storage layer on the transfer surface of the asperity pattern for multiple times, so as to manufacture a plurality of fifth structures having the second substrate with the asperity patterns formed on both surfaces thereof by the first ultraviolet curable resin and the information storage layers further formed on the asperity patterns; and a process of applying a second ultraviolet curable resin to a first substrate, bonding the surface where one information storage layer is formed in at least one fifth structure to the surface where the second ultraviolet curable resin is applied, spreading the second ultraviolet curable resin by a spin coating technique, and then irradiating the second ultraviolet curable resin with ultraviolet rays from outside, and a process of applying a second ultraviolet curable resin to the surface where the information storage layer of another side in the fifth structure is formed, bonding a third substrate to the surface where the second ultraviolet curable resin is applied, spreading the second ultraviolet curable resin by a spin coating technique, and then irradiating the second ultraviolet curable resin by ultraviolet rays from outside, so as to alternately laminate and bond the fifth structure and the third substrate multiple times on the first substrate with the second ultraviolet curable resin interposed therebetween.

4. The method of manufacturing the optical information recording medium according to claim 1, wherein a film thickness of the first ultraviolet curable resin is within a range from 0.5 μm to 5 μm.

5. The method of manufacturing the optical information recording medium according to claim 1, wherein a film thickness of the second ultraviolet curable resin is within a range from 0.5 µm to 5 µm.

6. The method of manufacturing the optical information recording medium according to claim 1, wherein a thickness of the first substrate is within a range from 90 µm to 1200 µm.

7. An optical information recording medium that is manufactured by the method of manufacturing the optical information recording medium according to claim 1.

8. The optical information recording medium according to claim 7, wherein a film thickness of the first ultraviolet curable resin is within a range from 0.5 µm to 5 µm.

9. The optical information recording medium according to claim 7, wherein a film thickness of the second ultraviolet curable resin is within a range from 0.5 µm to 5 µm.

10. The optical information recording medium according to claim 7, wherein a thickness of the first substrate is within a range from 90 µm to 1200 µm.

* * * * *